United States Patent
Yasuda et al.

(10) Patent No.: US 9,699,821 B2
(45) Date of Patent: Jul. 4, 2017

(54) COMMUNICATION DEVICE

(71) Applicant: NEC Corporation, Minato-ku, Tokyo (JP)

(72) Inventors: Masato Yasuda, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/026,682

(22) PCT Filed: Oct. 23, 2014

(86) PCT No.: PCT/JP2014/005384
§ 371 (c)(1),
(2) Date: Apr. 1, 2016

(87) PCT Pub. No.: WO2015/064068
PCT Pub. Date: May 7, 2015

(65) Prior Publication Data
US 2016/0255673 A1    Sep. 1, 2016

(30) Foreign Application Priority Data

Oct. 30, 2013  (JP) .................................. 2013-225137

(51) Int. Cl.
*H04B 7/00*      (2006.01)
*H04W 76/02*     (2009.01)
(Continued)

(52) U.S. Cl.
CPC ......... *H04W 76/027* (2013.01); *H04W 4/008* (2013.01); *H04W 76/023* (2013.01); *H04W 84/20* (2013.01); *H04W 84/12* (2013.01)

(58) Field of Classification Search
CPC . H04W 76/027; H04W 76/023; H04W 4/008; H04W 84/12
(Continued)

(56) References Cited

U.S. PATENT DOCUMENTS 7,292,870 B2 * 11/2007 Heredia .................... G06F 8/60
                                                      455/3.01
2007/0066304 A1 *  3/2007 Lee ....................... H04W 48/20
                                                       455/436
(Continued)

FOREIGN PATENT DOCUMENTS

| JP | 2001-268616 A | 9/2001 |
| JP | 2009-130918 A | 6/2009 |
| JP | 2012-129898 A | 7/2012 |

OTHER PUBLICATIONS

International Search Report for PCT Application No. PCT/JP2014/005384, mailed on Jan. 13, 2015.
(Continued)

*Primary Examiner* — April G Gonzales

(57) ABSTRACT

A storage part stores the history of a failure in connection to the other communication device. A searching part performs search for the other communication device. A connection availability determination part performs determination whether or not to connect to the other communication device found in the search on the basis of the history. A connection control part causes the searching part to perform the search again in a case where it is determined not to connect. On the other hand, in a case where it is determined to connect, the connection control part executes a connection process of connecting to the other communication device and, when the connection process fails, the connection control part performs update of the history and causes the searching part to perform the search again.

11 Claims, 19 Drawing Sheets

(51) Int. Cl.
*H04W 84/20* (2009.01)
*H04W 4/00* (2009.01)
*H04W 84/12* (2009.01)

(58) Field of Classification Search
USPC ........................................................ 455/41.2
See application file for complete search history.

(56) References Cited

U.S. PATENT DOCUMENTS

2009/0005024 A1* 1/2009 Kato ..................... H04M 1/006
   455/417
2012/0315900 A1* 12/2012 Wen ..................... H04W 36/245
   455/434
2013/0244723 A1* 9/2013 Yerrabommanahalli H04W 48/16
   455/552.1

OTHER PUBLICATIONS

Wi-Fi Alliance Technical Committee P2P Task Group Wi-Fi Peer-to-Peer (P2P) Technical Specification Version 1.1 2010.

* cited by examiner

COMMUNICATION DEVICE

This application is a National Stage Entry of PCT/JP2014/005384 filed on Oct. 23, 2014, which claims priority from Japanese Patent Application 2013-225137 filed on Oct. 30, 2013, the contents of all of which are incorporated herein by reference, in their entirety.

TECHNICAL FIELD

The present invention relates to a communication device, a communication connection method and program thereof, a communication network system, and a communication connection method thereof.

BACKGROUND ART

As a type of short-distance communication network, a communication network conforming to the Wi-Fi Direct specification has been known (see Non-Patent Document 1, for example). In this type of communication network, among a plurality of communication devices participating in a certain network, one of the communication devices functions as a master (a group owner) having an access point function, and the remaining communication devices function as slaves (clients) of the master. Compared with a Wi-Fi Ad-hoc network in which only one-to-one connection is available, a communication network conforming to the Wi-Fi Direct specification has features such as one-to-many connection is available, communication between the slaves can be established via the master, and the strength of security is relatively high. Thus, in recent years, a communication network conforming to the Wi-Fi Direct specification has been used in various applications such as data sharing. The present invention relates to a method for configuring such a communication network conforming to the Wi-Fi Direct specification. However, application of the present invention is not limited to a communication network conforming to the Wi-Fi Direct specification.

Patent Document 1 describes an exemplary method for configuring a communication network conforming to the Wi-Fi Direct specification. In Patent Document 1, a communication device intending to form a communication network first searches the surroundings thereof for another communication device which is to be a connection destination. When finding another communication device in the search, the communication device then performs group owner negotiation with the other communication device and determines the master (the group owner). After determination of the master, through a predetermined connection procedure, the communication device and the other communication device connect to each other and configure a communication network. Moreover, in Patent Document 1, in the group owner negotiation with the other communication device, the communication device determines whether or not exchange of information with the other communication device has succeeded, on the basis of a response signal transmitted from the other communication device. In the case of determining that the exchange of information has failed, the communication device determines whether or not to automatically change the setting depending on the cause of the failure. When determining to automatically change the setting, the communication device automatically changes the setting, and performs group owner negotiation with the other communication device again in accordance with the changed setting.

Patent Document 1: Japanese Unexamined Patent Application Publication No. JP-A 2012-129898

Non-Patent Document 1: Wi-Fi Alliance Technical Committee P2P Task Group Wi-Fi Peer-to-Peer (P2P) Technical Specification Version 1.1

The technique described in Patent Document 1 is to, for a counterpart communication device that the local communication device has failed to perform group owner negotiation, change the setting and performing group owner negotiation again, and the technique is premised on that there is a possibility of success in group owner negotiation when the setting is changed. However, when the failure is not caused by the local communication device but is caused by the counterpart communication device, there is no guarantee of success in group owner negotiation how the setting of the local communication device is changed. Thus, actually, it is general, in a case where the number of trials has reached a predetermined number of times, to abandon connection to the other communication device without trying group owner negotiation any more. The above example shows a case where connection to another communication device fails because of a failure in group owner negotiation. However, a failure in connection may occur not only in group owner negotiation for determining the master but also in another connection phase.

When a communication device intending to form a communication network fails in connection to another communication device for any reason, the communication device again searches for another communication device existing therearound. At this time, in a case where the other communication device which the local communication device has found in the last search and failed to connect to still exists around the local communication device, the other communication device found last time may be first found even if still another communication device exists. Then, the communication device again executes the process for connecting to the found other communication device. This is because there is no way to check that the currently found communication device is the communication device having been found previously and having failed in the connection process. As a result, the connection process fails again. In other words, there is a problem as described below: in a case where another communication device with problem and another communication device without problem exist around the local communication device and the other communication device with problem is first found every time a process of searching for another communication device is executed, a process that the other communication device with problem is found, connection is tried in vain, the other communication device with problem is found again and connection is tried in vain is repeated in spite of the presence of the communication device without problem around the local device, and the local device cannot connect forever to the connection device without problem.

SUMMARY

An object of the present invention is to provide a communication device which solves the abovementioned problem, namely, a problem that a process for connecting to the same other communication device is repeated in vain and consequently it is difficult to connect to another communication device which can succeed in the connect process without trouble.

A communication device as a first aspect of the present invention is a communication device configuring a communication network in which one of a plurality of communication terminals functions as a master having an access point function and another of the communication terminals functions as a slave to the master.

The communication device has:

a storage part storing a history of a failure in connection to the other communication device;

a searching part performing search for the other communication device existing around the local communication device;

a connection availability determination part performing determination whether or not to connect to the other communication device on a basis of the history of the failure in connection to the other communication device found in the search; and a connection control part causing the searching part to perform the search again when it is determined not to connect to the other communication device, while executing a connection process of connecting to the other communication device when it is determined to connect to the other communication device and, when the connection process fails, performing update of the history of the failure in connection to the other communication device and causing the searching part to perform the search again.

A communication connection method as a second aspect of the present invention is a communication connection method executed by a communication device configuring a communication network in which one of a plurality of communication terminals functions as a master having an access point function and another of the communication terminals functions as a slave to the master, and the communication device has a storage part storing a history of a failure in connection to the other communication device.

The communication connection method includes:

performing search for the other communication device existing around the local communication device;

performing determination whether or not to connect to the other communication device on a basis of the history of the failure in connection to the other communication device found in the search; and performing the search again in a case where it is determined not to connect to the other communication device, while executing a connection process of connecting to the other communication device in a case where it is determined to connect to the other communication device and, when the connection process fails, performing update of the history of the failure in connection to the other communication device and performing the search again.

A computer program as a third aspect of the present invention includes instructions for causing a computer to function as follows. The computer configures a communication device that configures a communication network in which one of a plurality of communication terminals functions as a master having an access point function and another of the communication terminals functions as a slave to the master and that has a storage part storing a history of a failure in connection to another communication device.

The computer program includes instructions for causing the computer to function as:

a searching part performing search for the other communication device existing around the local communication device;

a connection availability determination part performing determination whether or not to connect to the other communication device on a basis of the history of the failure in connection to the other communication device found in the search; and a connection control part causing the searching part to perform the search again when it is determined not to connect to the other communication device, while executing a connection process of connecting to the other communication device when it is determined to connect to the other communication device and, when the connection process fails, performing update of the history of the failure in connection to the other communication device and causing the searching part to perform the search again.

As the present invention has the configurations described above, it is possible to prevent repetition of reconnection to another communication device which cannot be connected, and it is possible to speedily connect to another communication device which can be connected without trouble.

EXEMPLARY EMBODIMENTS

Figure 1:
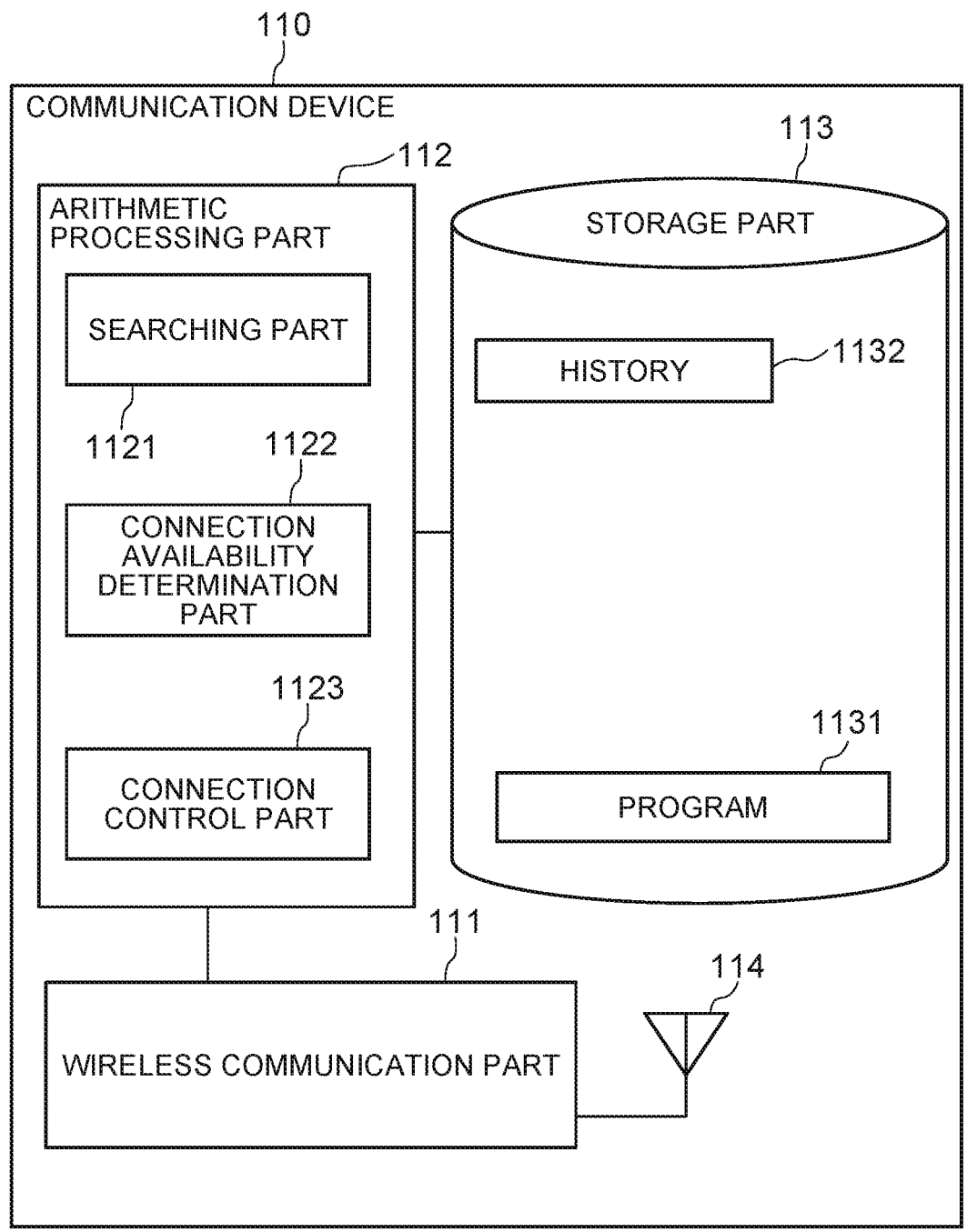
FIG. 1 is a block diagram of a first exemplary embodiment of the present invention.

Next, exemplary embodiments of the present invention will be described in detail referring to the drawings.

First Exemplary Embodiment

Referring to FIG. 1, a communication device 110 according to a first exemplary embodiment of the present invention is a wireless communication terminal which forms a communication network conforming to the Wi-Fi Direct specification. The communication device 110 includes a wireless communication part 111, an arithmetic processing part 112, a storage part 113, and an antenna 114.

The wireless communication part 111 has a function of transmitting and receiving communication messages wirelessly to and from another communication device. At the time of transmission, the wireless communication part 111 creates a packet of a communication message in response to a request from the arithmetic processing part 112, performs processing such as addition of a header and an error detection code to the created packet, generates a modulation signal of a frequency band of a carrier wave from the processed data, and transmits it as a radio signal from the antenna 115. Moreover, at the time of reception, the wireless communication part 111 demodulates a radio signal received by the antenna 114 to decode the packet of a communication message, and transmits the communication message for which it is checked there is no error on the basis of the error detection code to the arithmetic processing part 112.

The storage part 113 is configured by a storage device such as a ROM (Read Only Memory), a RAM (Random Access Memory) and a hard disk, and stores a program 1131 and processing information. The program 1131 is a program loaded and executed by the arithmetic processing part 112 to realize various processing parts. Major processing information stored in the storage part 113 is a history 1132.

The history 1132 is a history for recording a failure in connection to another communication device. The history 1132 has identification information (for example, a MAC address, and the like) of another communication device and, if there is a failure in connection to a communication device identified by the identification information in the past, describes it as a history.

The arithmetic processing part 112 has a microprocessor such as an MPU and peripheral circuits thereof, and has a function of loading the program 1131 from the storage part 113 and executing the program 1131 to cause the above-mentioned hardware to cooperate with the program 1131 and realize various processing parts. Major processing parts realized by the arithmetic processing part 112 are a searching part 1121, a connection availability determination part 1122, and a connection control part 1123.

The searching part 1121 has a function of searching for another communication device around the communication device 110.

The connection availability determination part 1122 has a function of determining whether or not to connect to another communication device found in the search by the searching part 1121. To be specific, the connection availability determination part 1122 determines whether to connect to a found other communication device, on the basis of the history 1132 having the same identification information as the identification information of the found other communication device. For example, the connection availability determination part 1122 may determine not to connect when a history of a failure in connection is described in the history 1132 having the same identification information as the identification information of the found other communication device, and may determine to connect when such a history is not described.

The connection control part 1123 causes the searching part 1121 to perform the search again when the connection availability determination part 1122 determines not to connect to the other communication device. Moreover, the connection control part 1123 has a function of executing a process of connecting to the other communication device when the connection availability determination part 1122 determines to connect to the other communication device. When the connecting process fails, the connection control part 1123 updates the history 1132 having the identification information of the other communication device having failed in connection, leaves a history of failure in the process of connecting to the other communication device, and thereafter, causes the searching part 1121 to perform the search again.

Next, an operation of the communication device 110 according to this exemplary embodiment will be described.

Figure 2:
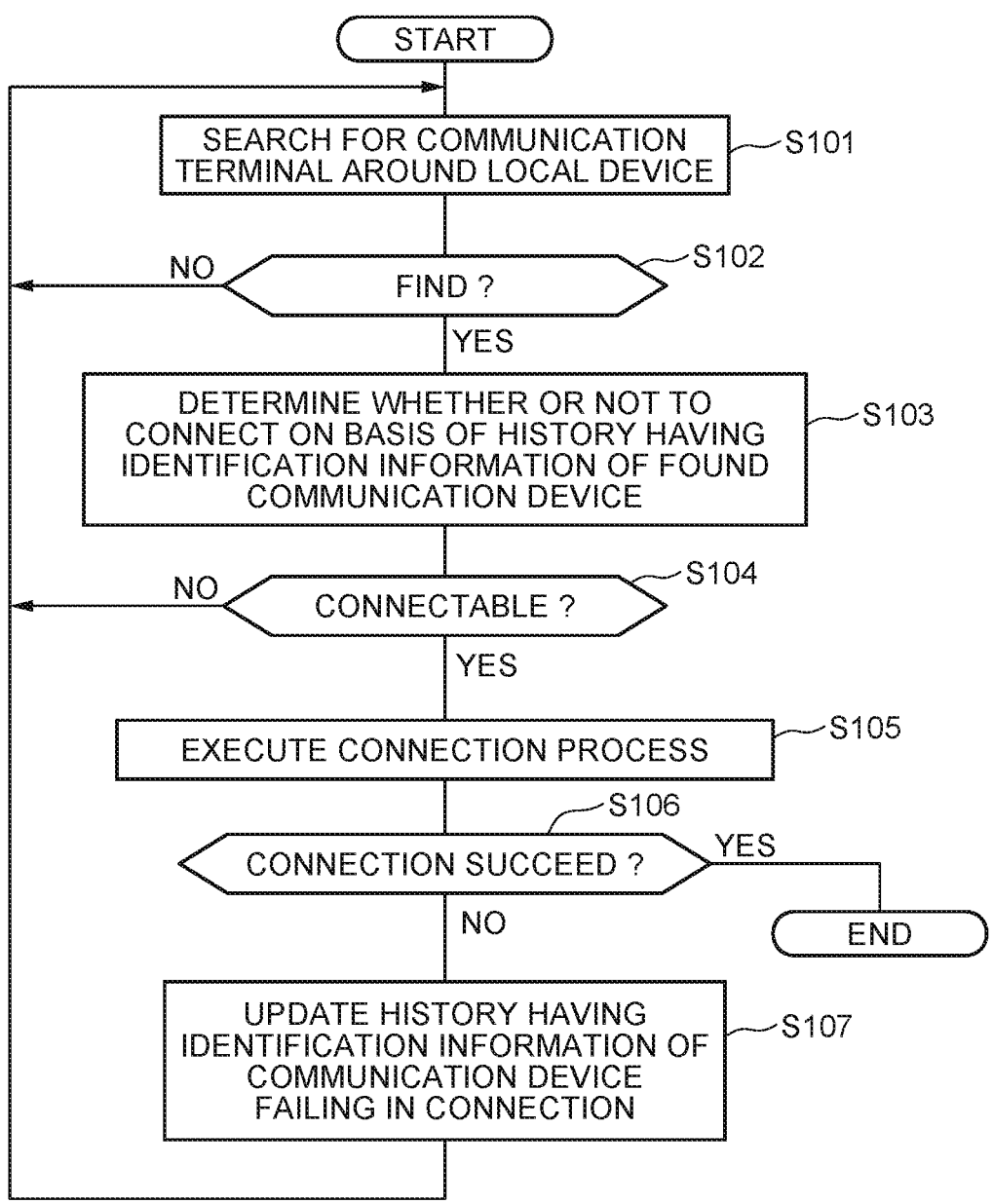
FIG. 2 is a flowchart showing an operation of the first exemplary embodiment of the present invention.

When started, the communication device 110 begins execution of processing shown in FIG. 2. First, the searching part 1121 of the communication device 110 searches for another communication device existing around the communication device 110 (step S101). In the case of finding another communication device (YES at step S102), the searching part 1121 notifies identification information (for example, MAC address) and the like of the found communication device to the connection availability determination part 1122 and ends the search. On the other hand, in the case of being unable to find another communication device, the searching part 1121 remains at step S101 and continues the search for another communication device around the local device.

When receiving the identification information and the like of the found communication device from the searching part 1121, the connection availability determination part 1122 determines whether or not to connect to the found communication device, on the basis of the connection history 1132 having the same identification information in the storage part 113 (step S103). The result of this determination is notified to the connection control part 1123 from the connection availability determination part 1122.

In a case where the connection availability determination part 1122 determines not to connect to the other communication device (NO at step S104), the connection control part 1123 instructs the searching part 1121 to perform the search. Consequently, the searching part 1121 starts the process of searching for another communication device around the local device again (step S101).

On the other hand, in a case where the connection availability determination part 1122 determines to connect to the other communication device (YES at step S104), the connection control part 1123 executes a predetermined connection process with the other communication device (step S105). The connection control part 1123 performs group owner negotiation to determine the master, and thereafter, executes authentication and encryption on the basis of WPS (Wi-Fi Protected Setup) and structures a group. Then, the connection control part 1123 determines whether or not the connection process with the other communication device has succeeded (step S106). When the connection process with the other communication device fails (NO at step S106), the connection control part 1123 updates the history 1132 having the identification information of the other communication device having failed in connection, and records a history of a failure in the connection process with the other communication device (step S107). Then, the connection control part 1123 instructs the searching part 1121 to perform the search. Consequently, the searching part 1121 starts the process of searching for another communication device existing around the local communication device again (step S101). On the other hand, when the connection process with the other communication device succeeds, the connection control part 1123 ends the processing shown in FIG. 2. Alternatively, instead of ending the processing shown in FIG. 2, the connection control part 1123 may return to the process of step S101 and further search for another connection device to connect.

Thus, according to this exemplary embodiment, it is possible to prevent the communication device 110 intending to connect to another communication device and form a communication network from repeating a process of reconnecting to another communication device which cannot be connected, and it is possible to speedily connect to another communication device which can be connected without trouble.

This is because: the communication device 110 records a failure in connection with another communication device as a history; when another communication device is found in later search, the communication device 110 determines whether or not to connect to the found other communication device, on the basis of the history; when determining not to connect, the communication device 110 does not execute the process of connecting to the abovementioned other communication device but performs search for another communication device again.

This exemplary embodiment is based on the configuration and operation described above, and may be modified and changed in various manners as shown below.

The history 1132 may include identification information of another communication device and a numerical value. In this case, the connection control part 1123 may add or subtract a given value to or from the numerical value in the history 1132 having identification information which coincides with identification information of another communication device failing in the connection process. Then, the connection availability determination part 1122 may compare, with a threshold, the numerical value in the history 1132 having identification information which coincides with identification information of another communication device found in the search by the searching part 1121 and, only when the magnitude relation between the numerical value and the threshold satisfies a predetermined condition, the connection availability determination part 1122 may determine to connect to the other communication device.

Further, the history 1132 may have identification information of another communication device, a numerical value, and time information representing time of last update of the history. In this case, in the update of the history 1132, the connection control part 1123 may add or subtract a given value to or from the numerical value in the history 1132 having identification information which coincides with identification information of another communication device failing in the connection process, and may also update the time information. Further, the connection availability determination part 1122 may compare, with a threshold, a numerical value in the history 1132 having identification information which coincides with identification information of another communication device found in the search by the searching part 1121 and also determine whether or not the time information in the history 1132 represents earlier time than the current time by a given time or more and, only when the magnitude relation between the numerical value and the threshold satisfies a predetermined condition, or when the time information in the history 1132 represents earlier time than the current time by a given time though the predetermined condition is not satisfied, the connection availability determination part 1122 may determine to connect to the other communication device.

Further, in the determination whether or not the time information in the history 1132 represents earlier time than the current time by a given time, the connection availability determination part 1122 may determine the given time on the basis of a difference between the numerical value in the history 1132 and the threshold, and determine whether or not the time information in the history 1132 represents earlier time than the current time by a given time by using the determined given time.

Further, the history 1132 may have identification information of another communication device, a numerical value, and the number of times that the other communication device is found in the search. In this case, in the update of the history 1132, the connection control part 1123 may add or subtract a given value to or from the numerical value in the history 1132 having identification information which coincides with identification information of another communication device failing in the connection process, and may also update the abovementioned number of times. Further, the connection availability determination part 1122 may compare, with a threshold, the numerical value in the history 1132 having identification information which coincides with identification information of another communication device found in the search by the searching part 1121 and also determine whether or not the number of times in the history 1132 is equal to or more than a given number of times and, only when the magnitude relation between the numerical value and the threshold satisfies a predetermined condition, or when the number of times in the history 1132 is equal to or more than a given number of times or more though the predetermined condition is not satisfied, the connection availability determination part 1122 may determine to connect to the other communication device.

Further, in the determination whether or not the number of times in the history 1132 is equal to or more than a given number of times, the connection availability determination part 1122 may determine the given number of times on the basis of a difference between the numerical value in the history 1132 and the threshold, and determine whether or not the number of times in the history 1132 is equal to or more than a given number of times by using the determined number of times.

Further, the storage part 113 may store a value corresponding to the cause of a failure in the connection process, and the connection control part 1123 may, in the update of the history 1132, add or subtract a value corresponding to the cause of the failure in the connection process to or from the numerical value in the history 1132 having identification information which coincides with identification information of another communication device failing in the connection process.

Further, the connection control part 1123 may be configured to, when the connection process with another communication device succeeds, initiate the numerical value in the history 1132 having identification information which coincides with identification information of the other communication device succeeding in the connection process.

Further, the storage part 113 may store the history 1132 separately for each of other communication devices. In this case, the connection availability determination part 1122 may check whether or not a history of another communication device found in the search by the searching part 1121 is stored in the storage part 113 and, when the history is not stored, the connection availability determination part 1122 may newly store the history 1132 for the found other communication device into the storage part 113. Moreover, when newly storing the history 1132 into the storage part 113, the connection availability determination part 1122 may determine whether or not the total number of the histories 1132 stored in the storage part 113 has reached a threshold and, in a case where the total number has reached the threshold, the connection availability determination part 1122 may delete the oldest history 1132 among the histories 1132 stored in the storage part 113, and thereafter, may newly store the history 1132 for a currently found other communication device into the storage part 113.

Further, the history 1132 may have time when this connection history has been newly stored or time when this connection history has been last updated. In this case, the arithmetic processing part 112 may have a deletion part which deletes a history having earlier time than the current time by a given time or more among the histories stored in the storage part 113.

Further, the history 1132 may have identification information of another communication device which the communication device 110 has failed to connect to most recently, and the number of times that the other communication device identified by the identification information has consecutively failed in the connection process. When the connection process succeeds, the connection control part 1123 may set the number of times in the history 1132 to an initial value. When the connection process fails, the connection control part 1123 may record identification information of another communication device failing in the connection process into the history 1132, and also increment the number of times. In the determination whether or not to connect, when identification information of another communication device found in the search does not coincide with identification information stored in the history 1132, the connection availability determination part 1122 may set the number of times to an initial value and determine to connect. When the identification information coincide with each other, in a case where the number of times in the history 1132 is more than a threshold, the connection availability determination part 1122 may determine to connect. In the other case, the connection availability determination part 1122 may determine not to connect Further, a communication network formed by the communication device 110 may be a communication network in which one of a plurality of communication devices functions as a master having an access point function and the remaining communication devices function as slaves of the master. Further, when searching for another communication device existing around the local communication device, the searching part 1121 may search for another communication device existing around the local communication device by sending a probe request to search for another communication device existing around the local communication device and receiving a probe response from another communication device receiving the probe request. Further, in a case where a plurality of other communication devices return probe responses to the probe request, the connection control part 1123 may determine the other communication device first returning the probe response among the other communication devices determined to be connectable by the connection availability determination part 1122, to be a connection destination.

Second Exemplary Embodiment

Figure 3:
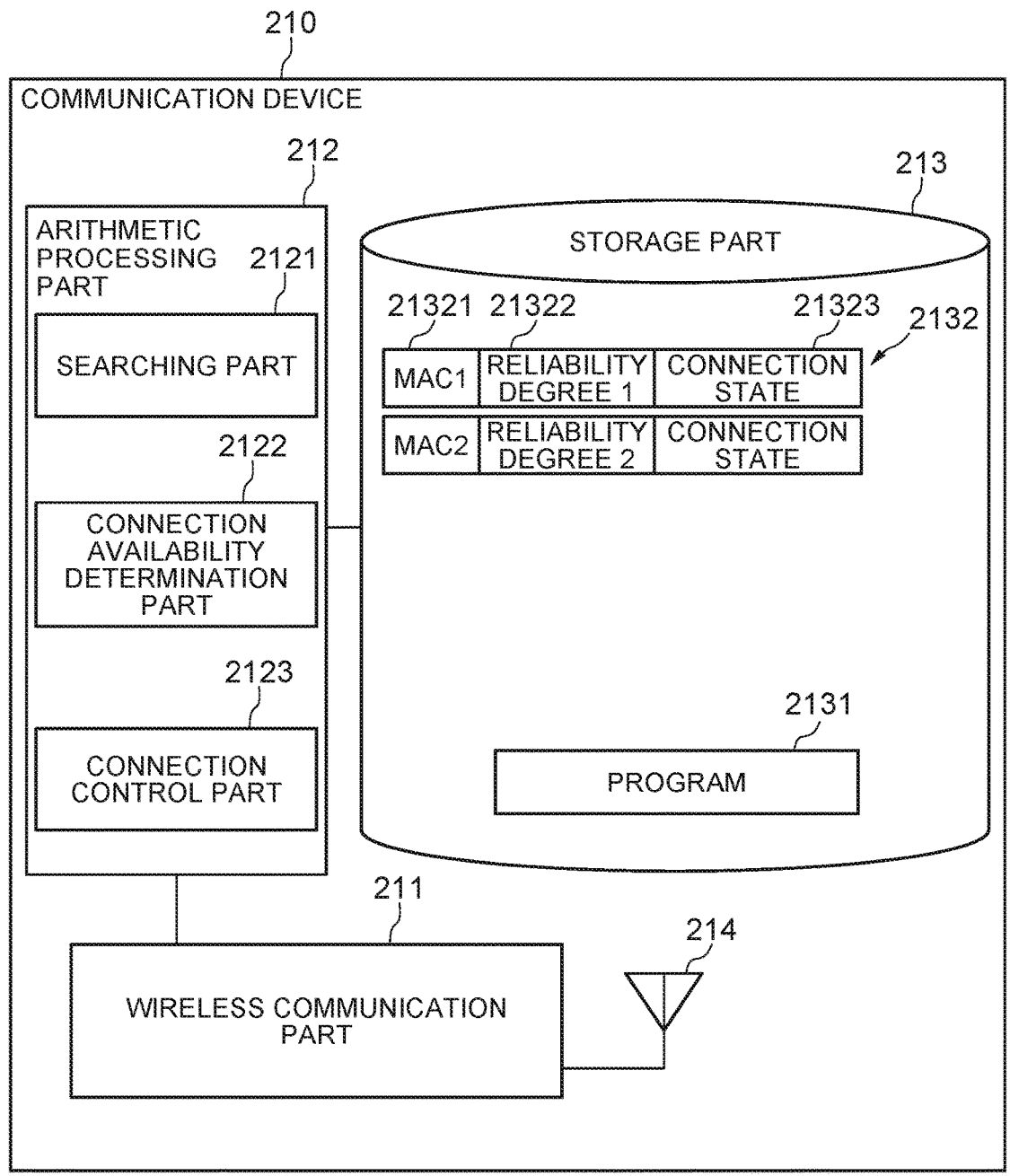
FIG. 3 is a block diagram of a second exemplary embodiment of the present invention.

Referring to FIG. 3, a communication device 210 according to a second exemplary embodiment of the present invention is a wireless communication terminal which forms a communication network conforming to the Wi-Fi Direct specification. The communication device 210 has a wireless communication part 211, an arithmetic processing part 212, a storage part 213, and an antenna 214. Among these parts, the wireless communication part 211 and the antenna 214 are the same as the wireless communication part 111 and the antenna 114 of the communication device 110 according to the first exemplary embodiment shown in FIG. 1.

The storage part 213 is configured by a storage device such as a ROM, a RAM and a hard disk, and stores a program 2131 and processing information. The program 2131 is a program loaded and executed by the arithmetic processing part 212 to realize various processing parts. Major processing information stored in the storage part 213 is other communication device information 2132.

The other communication device information 2132 is information of another communication device. The other communication device information 2132 has a MAC address 21321, a reliability degree 21322, and a connection state 21323. The MAC address 21321 is identification information of the other communication device. The reliability degree 21322 is a numerical value used when the communication device 210 determines whether or not to connect to the other communication device. The connection state 21323 represents a state of connection of the communication device 210 and the other communication device (not connected, already connected, and the like). The MAC address 21321 and the reliability degree 21322 correspond to the history for recording a failure in connection.

The arithmetic processing part 212 has a microprocessor such as an MPU and peripheral circuits thereof, and has a function of loading the program 2131 from the storage part 213 and executing the program 2131 to cause the above-mentioned hardware to cooperate with the program 2131 and realize various processing parts. Major processing parts realized by the arithmetic processing part 212 are a searching part 2121, a connection availability determination part 2122, and a connection control part 2123.

The searching part 2121 has a function of searching for another communication device existing around the communication device 210. To be specific, the searching part 2121 searches for another communication device which exists around the local communication device by sending out a probe request to search for another communication device existing around the local communication device and receiving a probe response from another communication device receiving this probe request.

Figure 4:
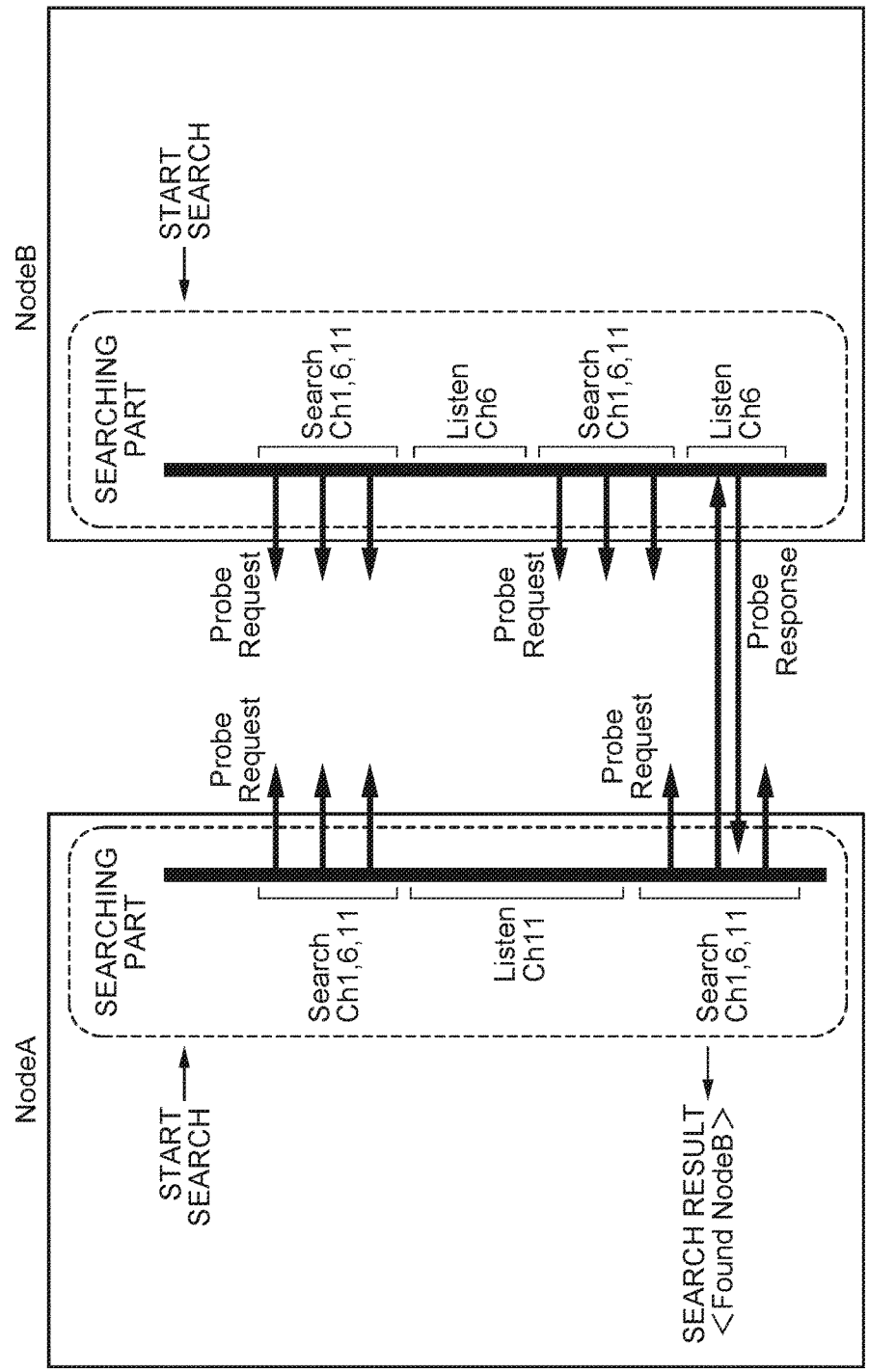
FIG. 4 is a diagram for describing an operation of a searching part in the second exemplary embodiment of the present invention.

An example of a process of searching for another communication device executed by the searching part 2121 is shown in FIG. 4. This process is the "Device Discovery" process conforming to the Wi-Fi Direct specification. Moreover, FIG. 4 shows an example of the "Device Discovery" operation of two communication devices NodeA and NodeB. When started, the communication devices NodeA and NodeB executes the Device Discovery process automatically or in accordance with an instruction from an application program (not shown) operating in the arithmetic processing part 112 or an instruction from a communication device user while the searching part 2121 alternately switch between Search state and Listen state at random time on the basis of the Wi-Fi Direct specification.

In Search state, the searching part 2121 changes the channel among channel 1, channel 6 and channel 11, issues a probe request conforming to the Wi-Fi Direct specification on each of the channels, and checks whether or not a probe response returns. When a probe response to the probe request returns, the searching part 2121 finds another communication device is present on the channel receiving the probe response. The search result is notified to the connection availability determination part 2122 from the searching part 2121. In Listen state, the searching part 2121 stands by on a channel of certain number and, when receiving a probe request on the stand-by channel, the searching part 2121 returns a probe response to the probe request to a transmission source communication device. With such a mechanism, the communication device detects the presence of another communication device.

The connection availability determination part 2122 has a function of determining whether or not to connect to another communication device found in the search by the searching part 2121. To be specific, the connection availability determination part 2122 searches the storage part 213 for the other communication device information 2132 having the same MAC address 21321 as the MAC address of the found other communication device, and compares a numerical value of the reliability degree 2132 in the other communication device information 2132 with a threshold. The connection availability determination part 2122 determines connectable when the numerical value of the reliability degree 21322 is more than the threshold, whereas determines unconnectable when the numerical value is equal to or less than the threshold. The result of determination of connection availability is notified to the connection control part 2123 from the connection availability determination part 2122.

When the connection availability determination part 2122 determines unconnectable, the connection control part 2123 causes the searching part 2121 to execute the search again. On the other hand, the connection control part 2123 has a function of, when the connection availability determination part 2122 determines connectable, executing a connection process conforming to the Wi-Fi Direct specification with the other communication device. Moreover, the connection control part 2123 determines whether the connection process has succeeded or failed. In the case of a failure in connection, the connection control part 2123 decreases by 1 the value of the reliability degree 21322 in the other communication device information 2132 having the same MAC address 21321 as the MAC address of the other communication device, and thereafter, causes the searching part 2121 to execute the search again. In a case where a plurality of other communication devices return probe responses to the probe request, the connection availability determination part 2122 determines connection availability for each of the other communication devices returning the probe responses. Then, in a case where the connection availability determination part 2122 determines a plurality of other communication devices are connectable, the connection control part 2123 determines, as a connection destination, the other communication device first returning the probe response among the plurality of other communication devices determined connectable.

Figure 5:
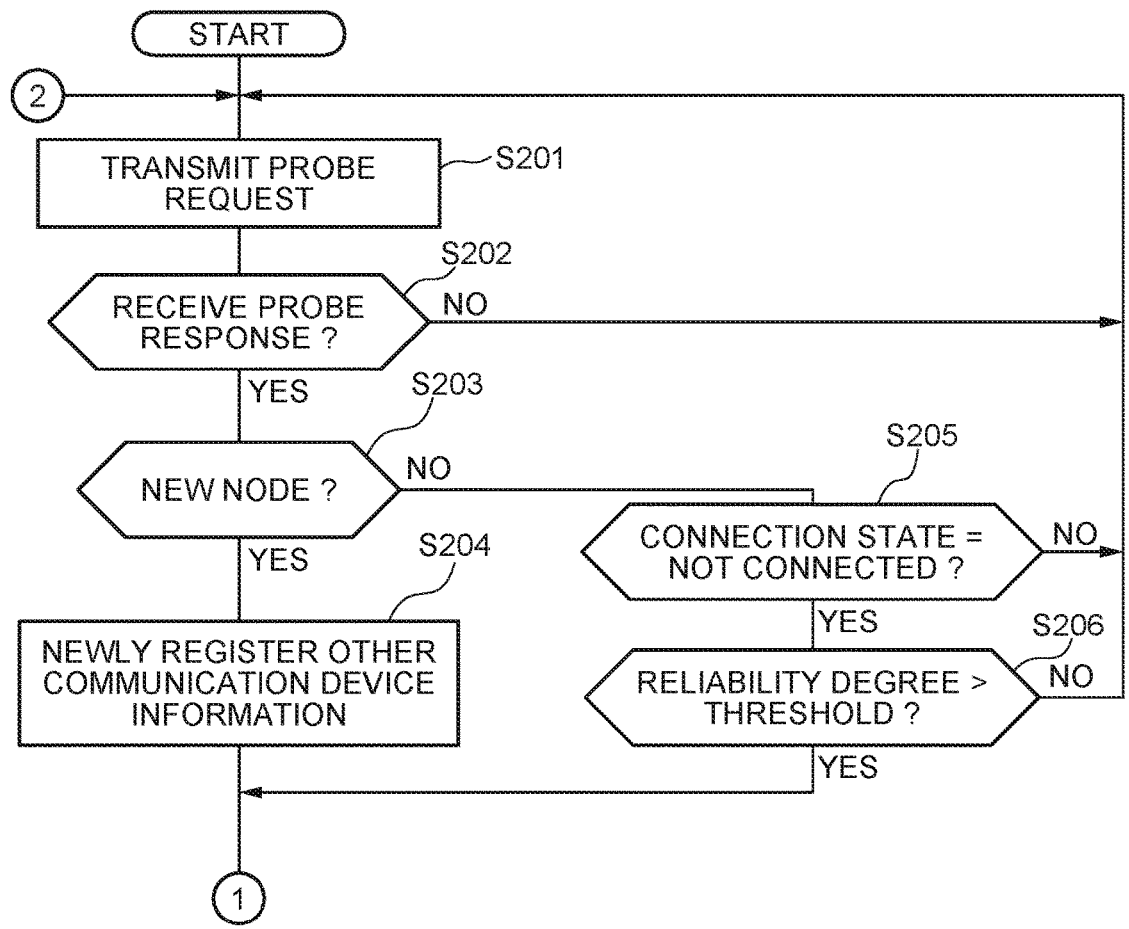
FIG. 5 is a flowchart showing an operation of the second exemplary embodiment of the present invention.
Figure 6:
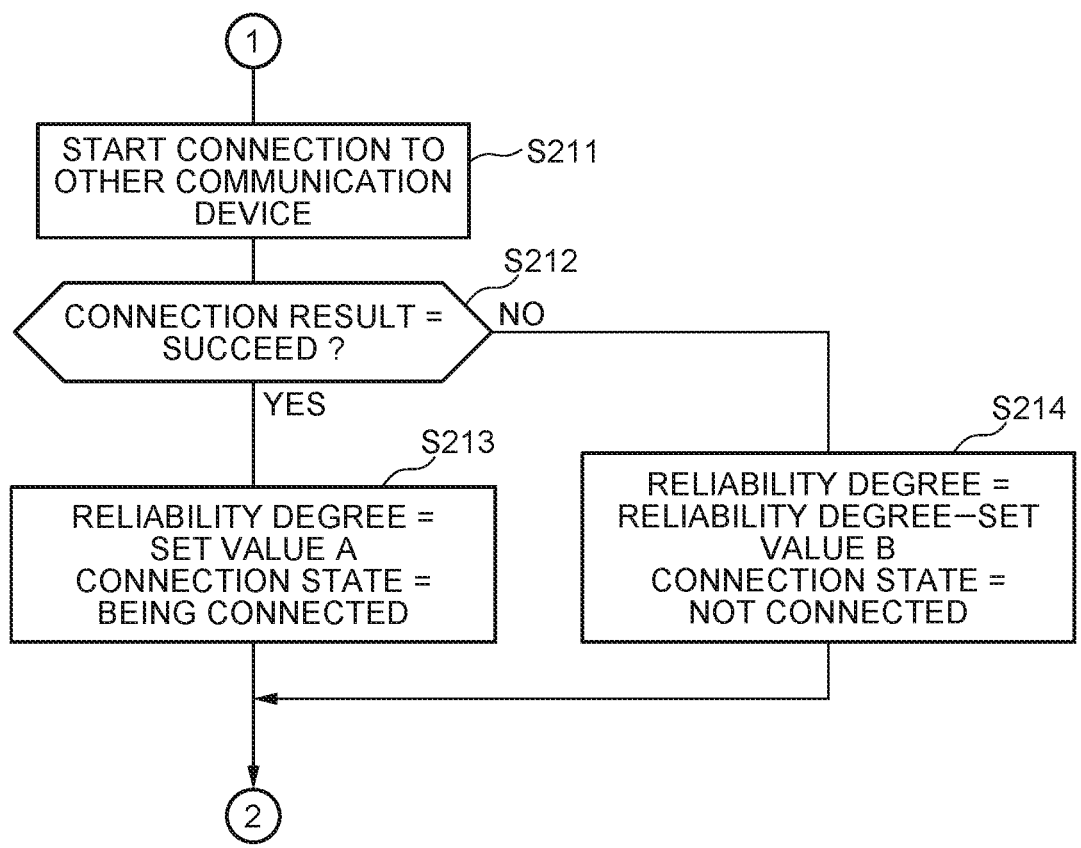
FIG. 6 is a flowchart showing an operation of the second exemplary embodiment of the present invention.

FIGS. 5 and 6 are flowcharts showing an operation of the communication device 210 according to this exemplary embodiment. Below, the operation of the communication device 210 according to this exemplary embodiment will be described referring to FIGS. 5 and 6.

When started, the communication device 210 begins execution of processing shown in FIG. 5. First, the searching part 2121 of the communication device 210 transmits and receives communication messages relating to the search to and from another communication device existing around the local communication device 210 through the wireless communication part 211, thereby searching for the communication device around the local communication device (steps S201 and S202). The search for the communication device around the local communication device is performed by the method which is conforming to the Device Discovery Procedure of the Wi-Fi Direct specification and is described referring to FIG. 4. When finding the communication device (YES at step S202), the searching part 2121 notifies the MAC address and the like of the found communication device to the connection availability determination part 2122 and ends the search. On the other hand, in the case of being unable to find the communication device, the searching part 2121 continues the process of searching for the communication device around the local communication device.

When receiving the MAC address and the like of the found communication device from the searching part 2121, the connection availability determination part 2122 determines whether or not the found communication device is a new node on the basis of whether or not the other communication device information 2132 corresponding to the found communication device is stored in the storage part 213 (step S203). In a case where the found communication device is a new node, the connection availability determination part 2122 newly creates the other communication device information 2132 for the found communication device and stores it into the storage part 213 (step S204). In the newly registered other communication device information 2132, the MAC address of the found communication device is recorded into the MAC address 21321, a predetermined initial value (a set value A) is recorded into the reliability degree 21322, and "not connected" is recorded into the connection state 21323. The set value A as the initial value is a positive integer and is a value equal to or more than 1. Then, the connection availability determination part 2122 notifies "connectable" to the connection control part 2123 with the information such as the MAC address.

On the other hand, in a case where the found communication device is not a new node (NO at step S203), the connection availability determination part 2122 determines whether or not the found communication device is a communication device which is not connected to the local communication device 210 on the basis of the connection state 21323 in the other communication device information 2132 corresponding to the found communication device (step S205). In a case where the found communication device is not a not-connected communication device (NO at step S205), the connection availability determination part 2122 instructs the searching part 2121 to perform the search via the connection control part 2123. Consequently, the searching part 2121 again starts the search for another communication device around the local communication device (step S201). In a case where the found communication device is a not-connected communication device (YES at step S205), the connection availability determination part 2122 compares the reliability degree 21322 in the other communication device information with a threshold (step S206). As the threshold, a smaller value than the set value A (for example, 0) is used. In a case where the value of the reliability degree is more than the threshold (YES at step S206), the connection availability determination part 2122 notifies connectable to the connection control part 2123 with the information such as the MAC address. However, in a case where the value of the reliability degree is equal to or more than the threshold (NO at step S206), the connection availability determination part 2122 instructs the searching part 2121 to perform the search via the connection control part 2123. Consequently, the searching part 2121 starts the search for another communication device around the local communication device (step S201).

When receiving notification of connectable from the connection availability determination part 2122, the connection control part 2123 executes a process of connecting the other communication device identified by the notified MAC address and the local communication device 210 (step S211 of FIG. 6). Then, the connection control part 2123 determines whether the connection process has succeeded or failed (step S212).

In a case where the connection process has failed, the connection control part 2123 subtracts a predetermined value (a set value B) from the numerical value of the reliability degree 21322 in the other communication device information 2132 corresponding to the communication device having failed in connection, and sets the connection state 21323 to "not-connected." As the set value B, a positive value (for example, 1) is used. Then, the connection control part 322 instructs the searching part 2121 to perform the search. Consequently, the searching part 2121 starts search for another communication device around the local communication device again (step S201).

On the other hand, in a case where the connection process has succeeded, the connection control part 2123 sets a predetermined initial value (the set value A) to the numerical value of the reliability degree 21322 in the other communication device information 2132 corresponding to the communication device having succeeded in connection, and sets the connection state 21323 to "being connected" (step S213). Then, the connection control part 2123 instructs the searching part 2121 to perform the search. Consequently, the searching part 2121 starts search for another communication device around the local communication device again (step S201).

Thus, according to this exemplary embodiment, it is possible to prevent the communication device 210 intending to connect to another communication device and form a communication network from repeatedly executing a process for reconnecting to another communication device which cannot be connected, and it is possible to speedily connect to another communication terminal which the communication device 210 can connect to without trouble. This is because the communication device 210 records a failure in the connection process as the history into the other communication device information 2132, and determines whether or not to connect to another communication device found in the search on the basis of the history.

Further, according to this exemplary embodiment, it is possible to regulate the number of times to repeat the reconnection process without abandoning when there is a possibility of connection, depending on how to set the initial value A of the reliability degree 21322, the value B subtracted each time, and the threshold. For example, in a case where the initial value A of the reliability degree 21322 is set to "2," the value B subtracted each time is set to "1" and the threshold is set to "0," the number of times to repeat the reconnection process without abandoning can be two times. In a case where the initial value A of the reliability degree 21322 is set to "5," the value B subtracted each time is set to "1" and the threshold is set to "0," the number of times to repeat the reconnection process without abandoning can be five times.

This exemplary embodiment is based on the configuration and operation described above, and can be modified and changed in the following manner.

In the above description, the connection control part 2123 subtracts a given value from the value of the reliability degree 21322 when the connection process fails, but may add a given value to the value of the reliability degree 21322 when the connection process fails. In a case where the value of the reliability degree 21322 increases every time the connection process fails, the connection availability determination part 2122 determines whether or not the reliability degree 21322 is more than the threshold in the determination at step S206. In a case where the reliability degree 21322 is more than the threshold, the connection availability determination part 2122 determines unconnectable. In a case where the reliability degree 21322 is not more than the threshold, the connection availability determination part 2122 determines connectable.

Third Exemplary Embodiment

Figure 7:
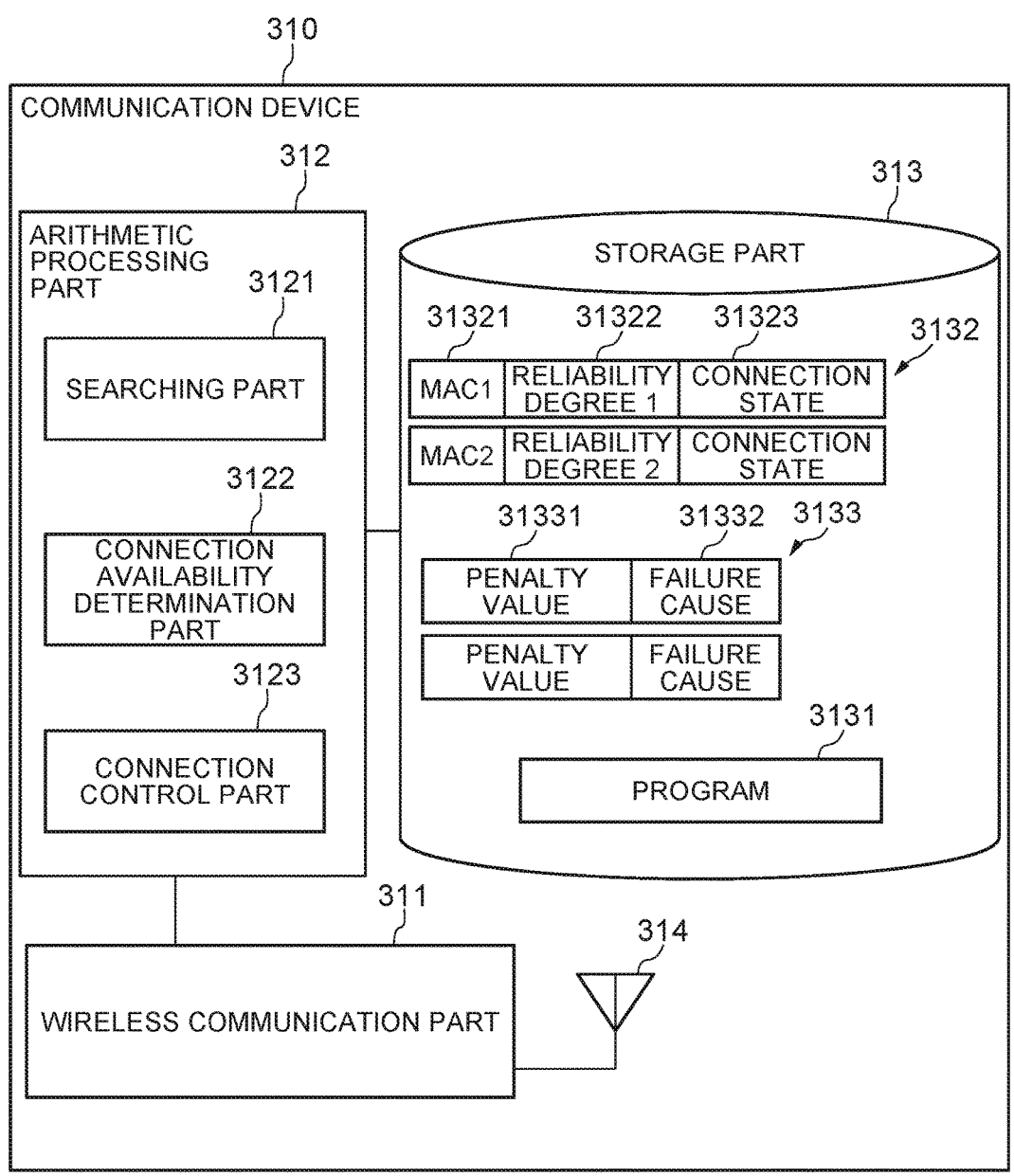
FIG. 7 is a block diagram of a third exemplary embodiment of the present invention.

Referring to FIG. 7, a communication device 310 according to a third exemplary embodiment of the present invention is a wireless communication terminal forming a communication network conforming to the Wi-Fi Direct specification. The communication device 310 has a wireless communication part 311, an arithmetic processing part 312, a storage part 313, and an antenna 314. Among these parts, the wireless communication part 311 and the antenna 314 are the same as the wireless communication part 111 and the antenna 114 of the communication device 110 according to the first exemplary embodiment shown in FIG. 1.

The storage part 313 is configured by a storage device such as a Rom, a RAM and a hard disk, and stores a program 3131 and processing information. The program 3131 is a program which is loaded and executed by the arithmetic processing part 312 and thereby realizes various processing parts. Major processing information stored in the storage part 313 is other communication device information 3132 and penalty information 3133. The communication device information 3132 is the same as the other communication device information 2132 of the communication device 210 according to the second exemplary embodiment shown in FIG. 3.

Plural pieces of penalty information 3133 are stored. Each of the penalty information 3133 has a penalty value 31331 and a failure cause 31332. The failure cause 31332 is information which specifies the cause of a failure in connection when the communication device 310 executes a process of connecting to another communication device. There are some causes of failures in connection: for example, PIN numbers do not coincide, the other communication device refuses connection, the number of times of connection is over, the other communication device is in the connection process with another device, timeout occurs, and so on.

The penalty value 31331 is a value to be subtracted from the reliability degree 31322 when connection to another communication device fails due to a failure cause corresponding to the penalty value. Penalty values are held for the respective failure causes because a connection possibility differs depending on the kind of a failure cause. In other words, some failure causes can be considered to be unconnectable obviously without repeating the connection process, and some failure are not unconnectable but can be considered to be less connectable. For example, when PIN numbers do not coincide, connection does not succeed no matter how many times connection is attempted. Further, in a case where connection is refused by another communication device, it can be said that connection is less likely to succeed as far as the other device changes its connection policy in the future. By setting penalty values to large values for failure causes which are less likely to allow connection even if reconnection is attempted, a useless attempt at reconnection is eliminated.

On the other hand, connection is temporarily unavailable in the following cases: the number of communication devices which another device currently connects to has already reached the supported maximum number of terminals; a process of connecting to another device is being executed; and the radio state is bad and timeout occurs. By setting penalty values to small values for failure causes which are likely to allow connection when reconnection is attempted, a number of opportunities for reconnection are given.

The arithmetic processing part 312 has a microprocessor such as an MPU and peripheral circuits thereof, and has a function of loading the program 3131 from the storage part 313 and executing the program 3131 to cause the abovementioned hardware to cooperate with the program 3131 and realize various processing parts. Major processing parts realized by the arithmetic processing part 312 are a searching part 3121, a connection availability determination part 3122, and a connection control part 3123. Among these parts, the searching part 3121 and the connection availability determination part 3122 are the same as the searching part 2121 and the connection availability determination part 2122 of the communication device 210 according to the second exemplary embodiment shown in FIG. 3.

When the connection availability determination part 3122 determines unconnectable, the connection control part 3123 causes the searching part 3121 to execute the search again. On the other hand, the connection control part 3123 has a function of, when the connection availability determination part 3122 determines connectable, executing a connection process conforming to the Wi-Fi Direct specification with the other communication device. Moreover, the connection control part 3123 determines whether the connection process succeeds or fails. When the connection process fails, the connection control part 3123 subtracts a penalty value from the value of the reliability degree 31322 in the other communication device information 3132 having the same MAC address 31321 as the MAC address of the other communication device, and thereafter, causes the searching part 3121 to execute the search again. As the penalty value used in the subtraction, a value stored in the storage part 313 in association with a failure cause of connection is used. That is to say, the connection control part 3123 searches the penalty information 3133 of the storage part 313 by using a failure cause as a key, acquires the penalty value 31331 from the penalty information 3133 having the same failure cause 31332, and executes the abovementioned subtraction process.

Next, an operation of the communication device 310 according to this exemplary embodiment will be described. In the operation of the communication device 310 according to this exemplary embodiment, the operation except that of the connection control part 3123 is the same as the operation of the communication device 210 according to the second exemplary embodiment. Below, the operation of the connection control part 3123 will be described.

Figure 8:
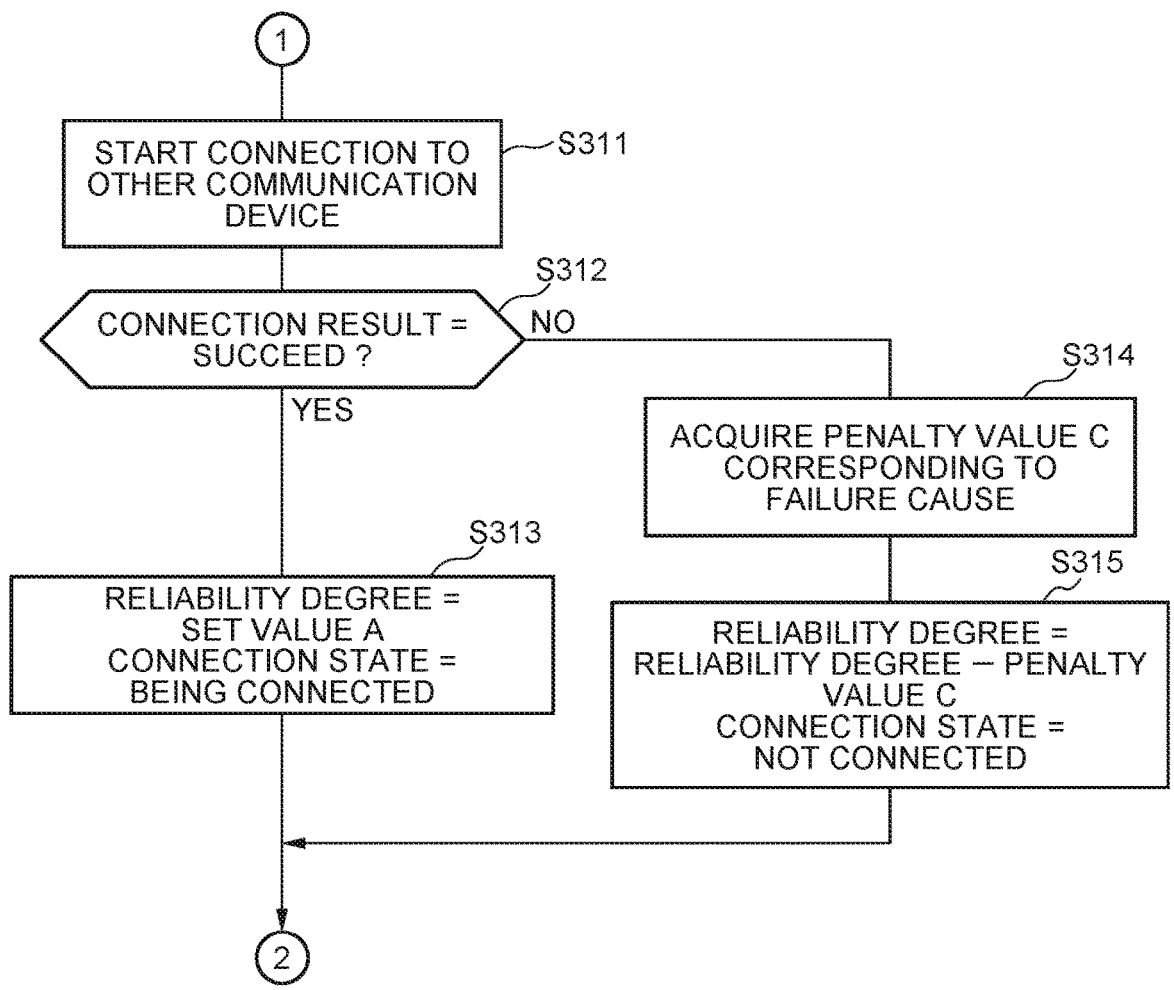
FIG. 8 is a flowchart showing an operation of a third exemplary embodiment of the present invention.

FIG. 8 is a flowchart showing the operation of the communication device 310 according to this exemplary embodiment. In FIG. 8, steps S311 to S313 are identical to steps S211 to S213 in FIG. 6. Referring to FIG. 8, when connections fails (NO at step S312), the connection control part 3123 searches the penalty information 3133 of the storage part 313 by using a failure cause as a key, and acquires the penalty value 31331 from the penalty information 3133 having the same failure cause 31332 (step S314). Next, the connection control part 3123 subtracts the acquired penalty value 31331 from the numerical value of the reliability degree 31322 in the other communication device information 3132 corresponding to the communication device having failed in connection, and sets the connection state 31323 to "not-connected" (step S315). Then, the connection control part 3123 instructs the searching part 3121 to perform the search. Consequently, the searching part 3121 starts the search for another communication device around the local communication device again.

Thus, according to this exemplary embodiment, for the same reason as in the second exemplary embodiment, it is possible to prevent the communication device 310 intending to connect to another communication device and form a communication network from repeating a process of reconnecting to another communication device which cannot be connected, and it is possible to speedily connect to another communication terminal with which the local communication device can complete a connection process without trouble.

Further, according to this exemplary embodiment, another communication device having failed in the connection process due to a failure cause which is less likely to allow connection even if reconnection is attempted can be given no opportunity for reconnection or, if given, only a few opportunities. On the other hand, another communication device having failed in the connection process due to a failure cause which is likely to be allow connection when reconnection is attempted can be given a number of opportunities for reconnection. This is because a penalty value corresponding to a failure cause is used.

This exemplary embodiment is based on the configuration and operation described above, and can be changed and modified in the following manner.

In the above description, the connection control part 3123 subtracts a given value from the value of the reliability degree 31322 when the connection process fails, but may be configured to add a penalty value to the value of the reliability degree 31322 when the connection process fails. In a case where the value of the reliability degree 31322 thus increases every time the connection process fails, the connection availability determination part 3122 determines in determination equivalent to step S206 whether or not the reliability degree 31322 is more than the threshold. Then, the connection availability determination part 3122 determines unconnectable when the reliability degree 31322 is more than the threshold, whereas determines connectable when the reliability degree 31322 is not more than the threshold.

Fourth Exemplary Embodiment

Figure 9:
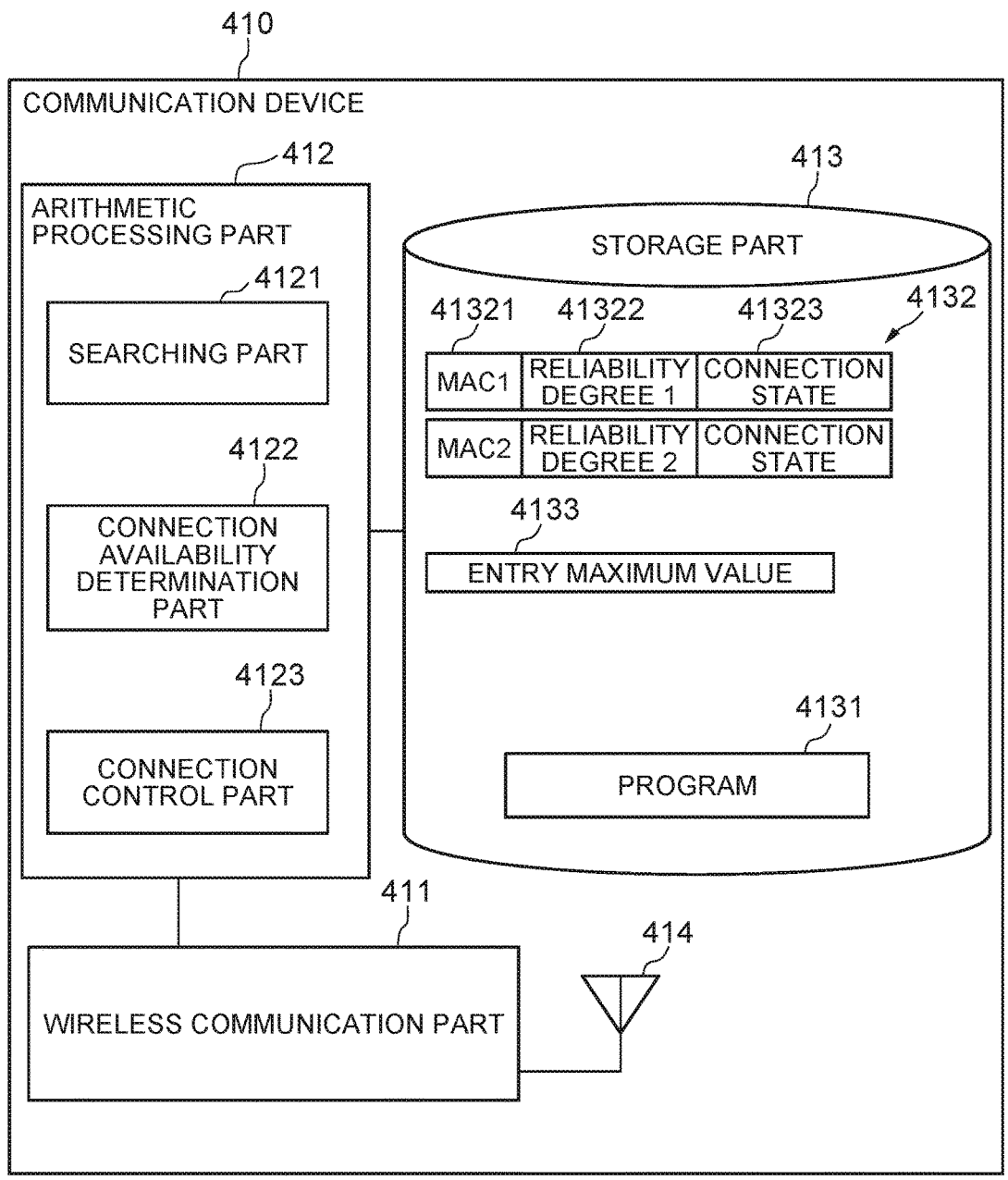
FIG. 9 is a block diagram of a fourth exemplary embodiment of the present invention.

Referring to FIG. 9, a communication device 410 according to a fourth exemplary embodiment of the present invention is a wireless communication terminal which forms a communication network conforming to the Wi-Fi Direct specification. The communication device 410 includes a wireless communication part 411, an arithmetic processing part 412, a storage part 413, and an antenna 414. Among these parts, the wireless communication part 411 and the antenna 414 are identical to the wireless communication part 111 and the antenna 114 of the communication device 110 according to the first exemplary embodiment shown in FIG. 1.

The storage part 413 is configured by a storage device such as a ROM, a RAM and a hard disk, and stores a program 4131 and processing information. The program 4131 is a program loaded and executed by the arithmetic processing part 412 to realize various processing parts. Major processing information stored in the storage part 413 is other communication device information 4132 and an entry maximum value 4133. The other communication device information 4132 is identical to the other communication device information 2132 of the communication device 210 according to the second exemplary embodiment shown in FIG. 3.

The entry maximum value 4133 represents the maximum number of the other communication device information 4132 stored in the storage part 413.

The arithmetic processing part 412 has a microprocessor such as an MPU and peripheral circuits thereof, and has a function of loading the program 4131 from the storage part 413 and executing the program 4131 to cause the abovementioned hardware to cooperate with the program 4131 and realize various processing parts. Major processing parts realized by the arithmetic processing part 412 are a searching part 4121, a connection availability determination part 4122, and a connection control part 4123. Among these parts, the searching part 4121 and the connection control part 4123 are identical to the searching part 2121 and the connection control part 2123 of the communication device 210 according to the second exemplary embodiment shown in FIG. 3.

The connection availability determination part 4123 has, in addition to the function which the connection availability determination part 2122 of the communication device 210 according to the second exemplary embodiment shown in FIG. 3 has, a function of controlling so that the total number of the other communication device information 4132 stored in the storage part 413 does not exceed an entry maximum value 4133. To be specific, before adding new other communication device information 4132 into the storage part 413, the connection availability determination part 4123 determines whether or not the total number of the other communication device information 4132 stored in the storage part 413 has reached the entry maximum value 4133, In a case where the total number has reached the entry maximum value 413, the connection availability determination part 4123 deletes the oldest other communication device information 4132 among the other communication device information 4132 stored in the storage part 413, and thereafter, stores the new other communication device information 4132 into the storage part 413. The oldest other communication device information 4132 may be detected by any method, for example, by: arranging the other communication device information 4132 in chronological order on the storage part 413; or adding time information representing time when the other communication device information 4132 has been registered into the storage part 413, to the other communication device information 4132.

Next, an operation of the communication device 410 according to this exemplary embodiment will be described. In the operation of the communication device 410 according to this exemplary embodiment, the operation except that of the connection availability determination part 4122 is the same as the operation of the communication device 210 according to the second exemplary embodiment. Below, the operation of the connection availability determination part 4122 will be described.

Figure 10:
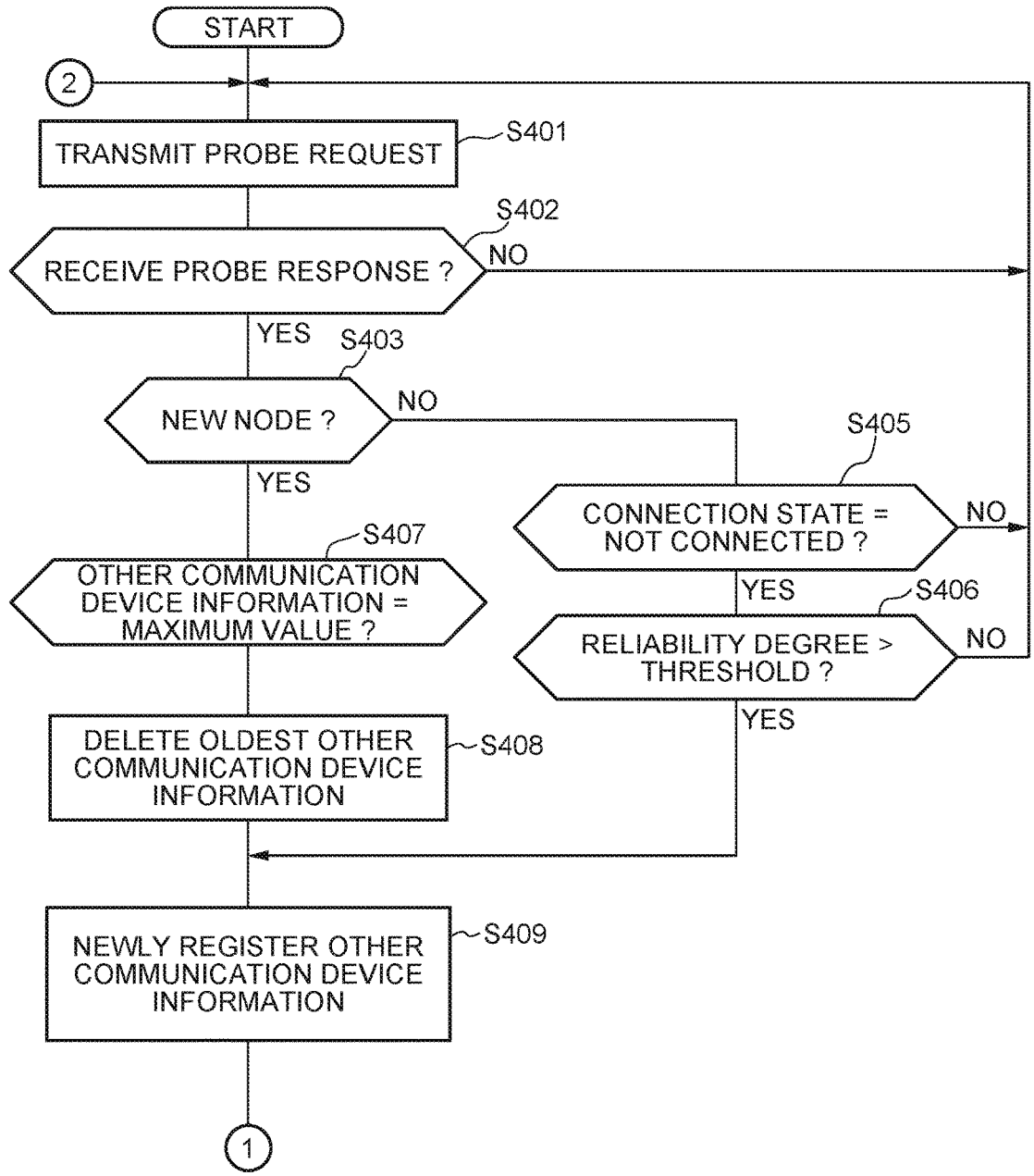
FIG. 10 is a flowchart showing an operation of the fourth exemplary embodiment of the present invention.

FIG. 10 is a flowchart showing the operation of the communication device 410 according to this exemplary embodiment. In FIG. 10, steps S401 to S403, S405 to S406, and S409 are identical to steps S201 to S203, S205 to S206, and S204, and the operation described below is different.

In a case where the found communication device is a new node (YES at step S403), the connection availability determination part 4122 determines whether or not the total number of the other communication device information 4132 stored in the storage part 413 has reached the entry maximum value 4133 (step S407). In a case where the total number has reached the entry maximum value 4133, the connection availability determination part 4122 deletes the oldest one of the other communication device information 4132 stored in the storage part 413 (step S408). Then, the connection availability determination part 4122 proceeds to a process of step S409. On the other hand, in a case where the total number of the other communication device information 4132 has not reached the entry maximum value 4133, the connection availability determination part 4122 skips the process of step S408 and proceeds to the process of step S409. At step S409, the connection availability determination part 4122 newly creates the other communication device information 4132 for the found communication device, and stores it into the storage part 413.

Thus, according to this exemplary embodiment, the same effect as in the second exemplary embodiment can be obtained, and also the following effect can be obtained.

According to this exemplary embodiment, even when the communication device 410 operates under an environment that a number of other communication devices are found, increase of the number of the other communication device information 4132 does not weigh on the storage capacity of the storage part 413. This is because the connection availability determination part 4122 is configured to control so that the total number of the other communication device information 4132 stored in the storage part 413 does not exceed the entry maximum value 4133.

Fifth Exemplary Embodiment

Figure 11:
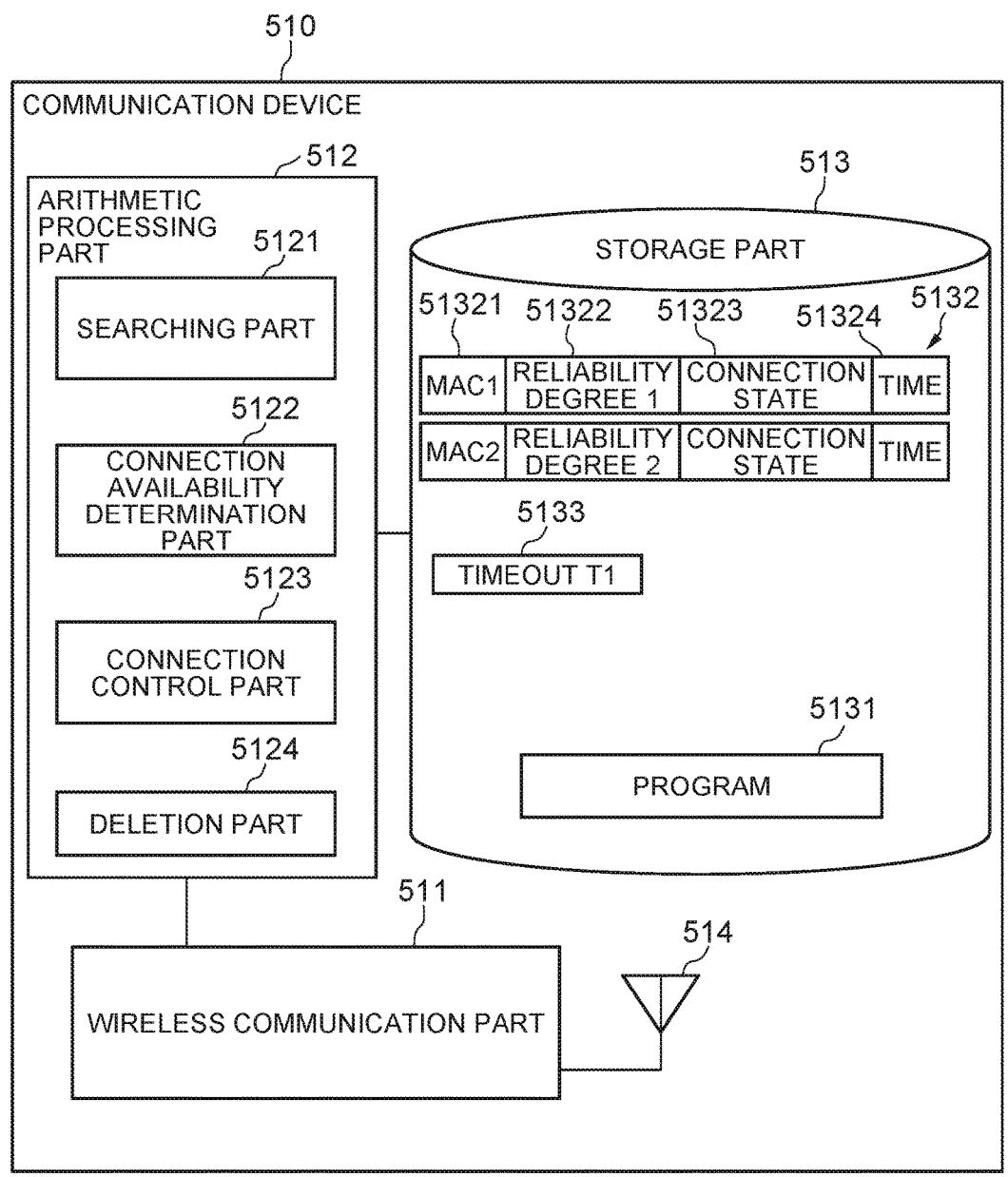
FIG. 11 is a block diagram of a fifth exemplary embodiment of the present invention.

Referring to FIG. 11, a communication device 510 according to a fifth exemplary embodiment of the present invention is a wireless communication terminal which forms a communication network conforming to the Wi-Fi Direct specification. The communication device 510 includes a wireless communication part 511, an arithmetic processing part 512, a storage part 513, and an antenna 514. Among these parts, the wireless communication part 511 and the antenna 514 are identical to the wireless communication part 111 and the antenna 114 of the communication device 110 according to the first exemplary embodiment shown in FIG. 1.

The storage part 513 is configured by a storage device such as a ROM, a RAM and a hard disk, and stores a program 5131 and processing information. The program 5131 is a program loaded and executed by the arithmetic processing part 512 to realize various processing parts. Major processing information stored in the storage part 513 is other communication device information 5132 and a timeout time (T1) 5133.

The other communication device information 5132 includes a MAC address 51321, a reliability degree 51322, a connection state 51323, and time 51324. The MAC address 51321, the reliability degree 51322 and the connection state 51323 are identical to the MAC address 21321, the reliability degree 21322 and the connection state 21323 of the communication device 210 according to the second exemplary embodiment of the present invention shown in FIG. 2. The time 51324 represents time when the communication device information 5132 is stored into the storage part 513 or updated last.

The timeout time 5133 represents a reference time to delete the other communication device information 5132 from the storage part 513. When the difference between the time 51324 in the other communication device information

5132 and the current time exceeds the timeout time 5133, this other communication device information 5132 is deleted from the storage part 513.

The arithmetic processing part 512 has a microprocessor such as an MPU and peripheral circuits thereof, and has a function of loading the program 5131 from the storage part 513 and executing the program 5131 to cause the above-mentioned hardware to cooperate with the program 5131 and realize various processing parts. Major processing parts realized by the arithmetic processing part 512 are a searching part 5121, a connection availability determination part 5122, a connection control part 5123 and a deletion part 5124. Among these parts, the searching part 5121 is identical to the searching part 2121 of the communication device 210 according to the second exemplary embodiment shown in FIG. 3.

The connection availability determination part 5123 has, in addition to the function which the connection availability determination part 2122 of the communication device 210 according to the second exemplary embodiment shown in FIG. 3 has, a function of, when newly registering the other communication device information 5132 for a new node into the storage part 513, recording registration time into the time 51324 in the other communication device information 5132.

Further, the connection control part 5123 has, in addition to the function which the connection control part 2123 of the communication device 210 according to the second exemplary embodiment has, a function of, when the reliability degree 51322 and the connection state 51323 are updated, recording (overwriting) the update time to the time 51324.

Further, the deletion part 5124 has a function of deleting the other communication device information 5132 having time 51324 earlier than the current time by the timeout time 5133 or more from the storage part 513, among the other communication device information 5132 stored in the storage part 513.

Next, an operation of the communication device 510 according to this exemplary embodiment will be described. In the operation of the communication device 510 according to this exemplary embodiment, the operation except that of the connection availability determination part 5122, the connection control part 5123 and the deletion part 5124 is the same as the operation of the communication device 210 according to the second exemplary embodiment. Below, the operation of the connection availability determination part 5122, the connection control part 5123 and the deletion part 5124 will be described.

First, the operation of the connection availability determination part 5122 will be described borrowing the flowchart of FIG. 5 showing the operation of the communication device 210 according to the second exemplary embodiment. In a case where the found other communication device is a new node (YES at step S203), the connection availability determination part 5122 registers the new other communication device information 5132 into the storage part 513 (step S204). When registering, the connection availability determination part 5122 records registration time into the time 51324 in the other communication device information 5132. The operation other than this operation is the same as the operation of the connection availability determination part 2122 of the communication device 210 according to the second exemplary embodiment.

Next, the operation of the connection control part 5123 will be described borrowing the flowchart of FIG. 6 showing the operation of the communication device 210 according to the second exemplary embodiment. When the connection process succeeds (YES at step S212), the connection control part 5123 updates the connection state 51323 in the other communication device information 5132 corresponding to the other communication device having succeeded in the connection process to "being connected," and sets the reliability degree 51322 to an initial value (step S213). In this process, the connection control part 5123 records (overwrites) the current time at that moment to the time in the other communication device information 5132. On the other hand, when the connection process fails (NO at step S212), the connection control part 5123 updates the connection state 51323 in the other communication device information 5132 corresponding to the other communication device having failed in the connection process to "not connected," and subtracts a given value from the value of the reliability degree 51322 (step S214). In this process, the connection control part 5123 records (overwrites) the current time at that moment to the time in the other communication device information 5132. The operation other than that operation is the same as the operation of the connection control part 2122 of the communication device 210 according to the second exemplary embodiment.

Figure 12:
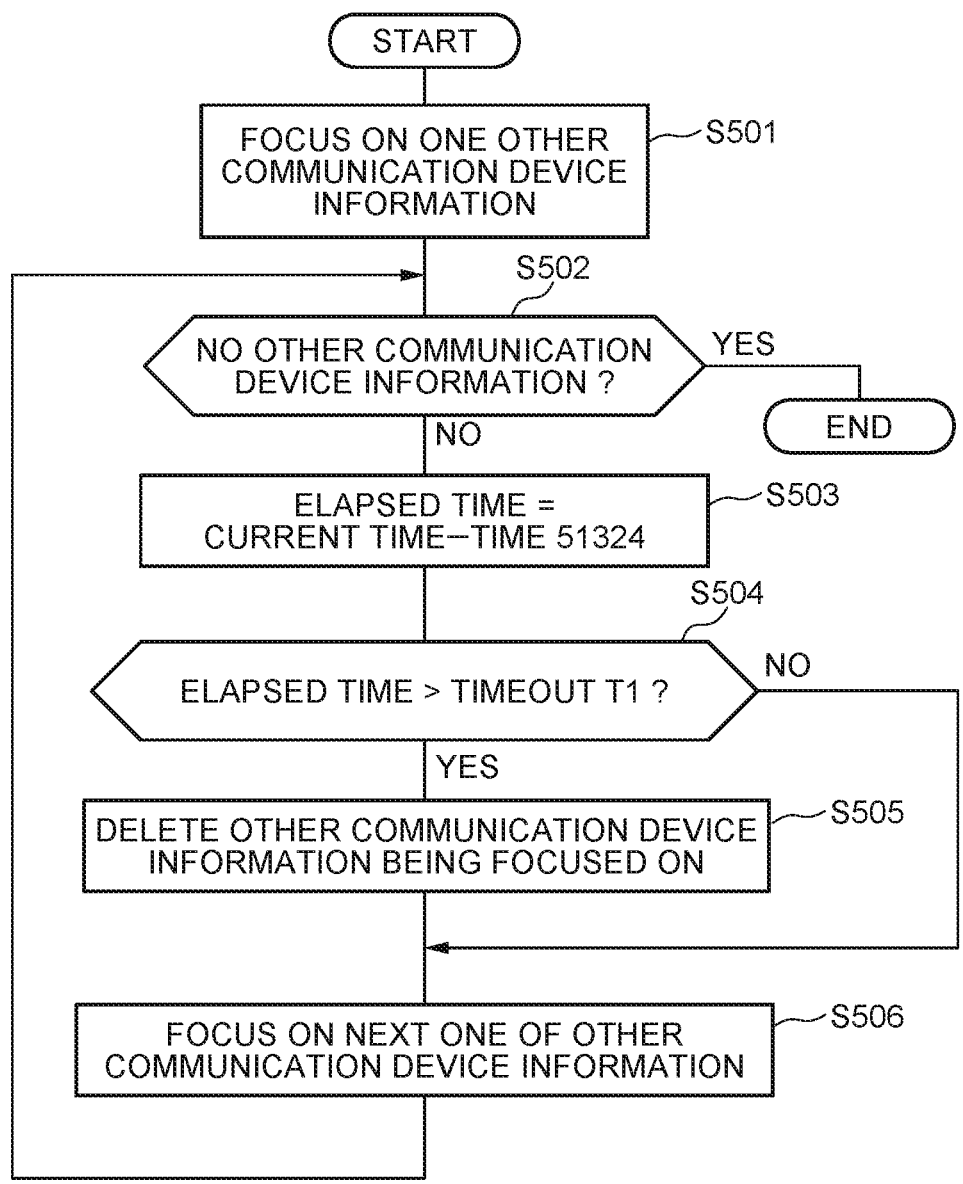
FIG. 12 is a flowchart showing an operation of the fifth exemplary embodiment of the present invention.

Next, the operation of the deletion part 5124 will be described. FIG. 12 is a flowchart showing the operation of the deletion part 5124. The deletion part 5124 regularly executes processing shown in FIG. 12 at given time intervals. When started, the deletion part 5124 focuses on one of the other communication device information 5132 stored in the storage part 513 (step S501). In a case where there is no other communication device information 5132 to be focused on (YES at step S502), the deletion part 5124 ends the current processing and stops the processing until started next time.

In a case where the other communication device information 5132 to be focused on is present (NO at step S502), the deletion part 5124 calculates an elapsed time from the time 51324 in the focused other communication device information 5132 to the current time (step S503), and determines whether or not the elapsed time is more than the timeout time 5133 (step S504). In a case where the elapsed time is more than the timeout time 5133, the deletion part 5124 deletes the focused other communication device information 5132 from the storage part 513 (step S505). Then, the deletion part 5124 proceeds to a process of step S506. In a case where the elapsed time is not more than the timeout time 5133, the deletion part 512 skips the process of step S505 and proceeds to the process of step S506.

At step S506, the deletion part 5124 focuses on next one of the other communication device information 5132 stored in the storage part 513. In a case where the other communication device information 5132 to be focused next is present (YES at step S502), the deletion part 5124 executes the same processing as the processing executed on the last focused other communication device information 5132, on the next focused other communication device information 5132. In a case where the other communication device information 5132 to be focused next is not present (YES at step S502), the deletion part 5124 ends the current processing and stops processing until started.

Thus, according to this exemplary embodiment, the same effects as in the second exemplary embodiment can be obtained, and also the following effect can be obtained.

According to this exemplary embodiment, even when the communication device 510 operates under an environment that a number of other communication devices are found, increase of the number of the other communication device information 5132 does not weigh on the storage capacity of the storage part 513. This is because the deletion part 5124 deletes the other communication device information 5132 including the time 51324 a given time or more before among the other communication device information 5132 stored in the storage part 513. Consequently, it is possible prevent that the other communication device information 5132 with a low use rate, such as information of another communication device which the local communication device has connected to when passing only one time, weighs on the capacity of the storage part 513.

Sixth Exemplary Embodiment

Figure 13:
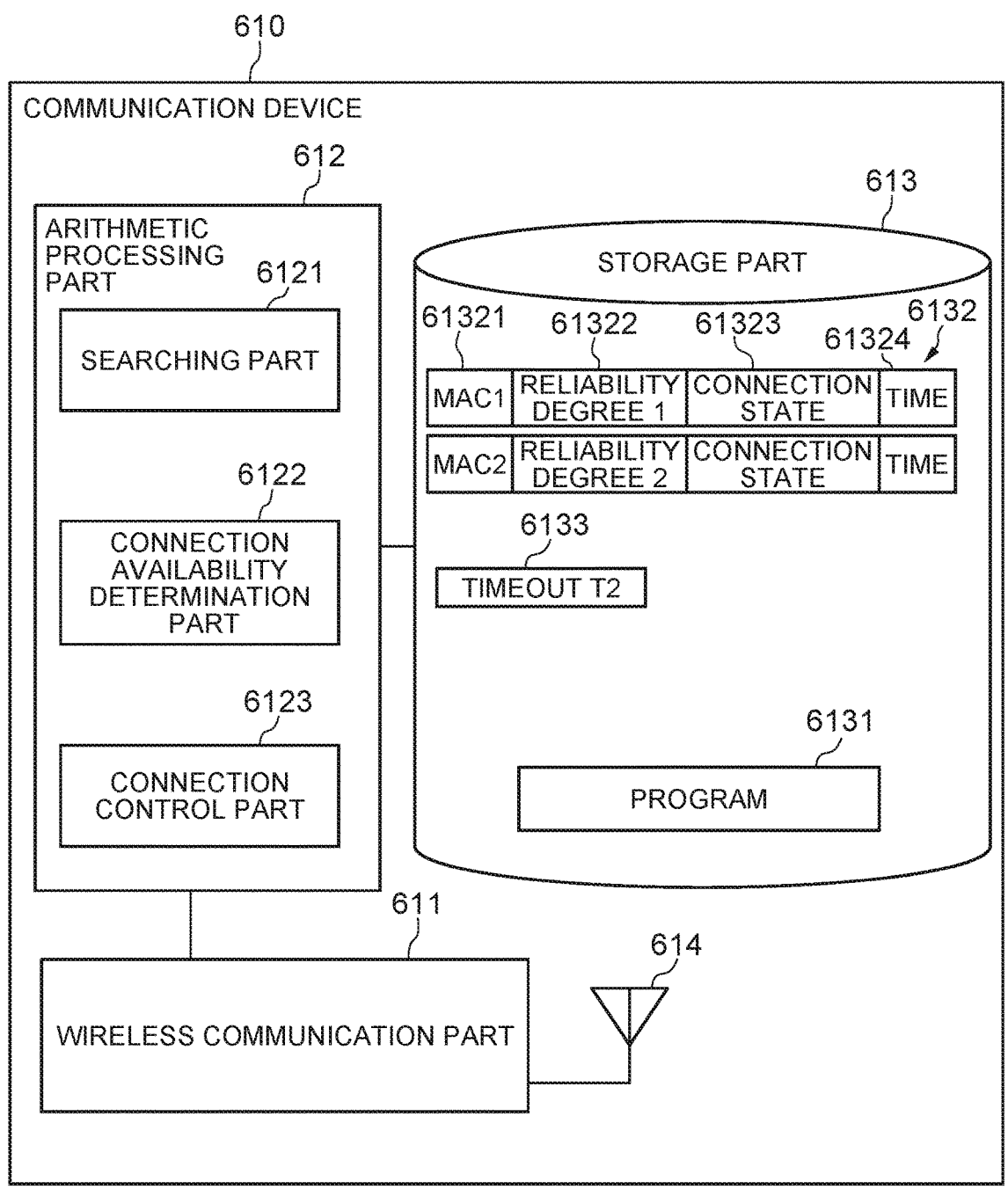
FIG. 13 is a block diagram of a sixth exemplary embodiment of the present invention.

Referring to FIG. 13, a communication device 610 according to a sixth exemplary embodiment of the present invention is a wireless communication terminal which forms a communication network conforming to the Wi-Fi Direct specification. The communication device 610 includes a wireless communication part 611, an arithmetic processing part 612, a storage part 613, and an antenna 614. Among these parts, the wireless communication part 611 and the antenna 614 are identical to the wireless communication part 111 and the antenna 114 of the communication device 100 according to the first exemplary embodiment shown in FIG. 1.

The storage part 613 is configured by a storage device such as a ROM, a RAM and a hard disk, and stores a program 6131 and processing information. The program 6131 is a program loaded and executed by the arithmetic processing part 612 to realize various processing parts. Major processing information stored in the storage part 613 is other communication device information 6132 and a timeout time 6133.

The other communication device information 6132 includes a MAC address 61321, a reliability degree 61322, a connection state 61323, and time 61324. The MAC address 61321, the reliability degree 61322 and the connection state 61323 are the same as the MAC address 21321, the reliability degree 21322 and the connection state 21323 of the other communication device information 2132 of the communication device 210 according to the second exemplary embodiment of the present invention shown in FIG. 2. The time 61324 represents time when the other communication device information 6132 is stored into the storage part 613 or updated last.

The timeout time (T2) 6133 is time information used for exceptionally relieving another communication device whose reliability degree 61322 has decreased to a value which cannot allow connection. Even another communication device whose reliability degree 61322 has decreased to a threshold or less is determined connectable in a case where an elapsed time from the time 61324 of the other communication device information 6132 to the current time is more than the timeout time 6133.

The arithmetic processing part 612 has a microprocessor such as an MPU and peripheral circuits thereof, and has a function of loading the program 6131 from the storage part 613 and executing the program 6131 to cause the abovementioned hardware to cooperate with the program 6131 and realize various processing parts. Major processing parts realized by the arithmetic processing part 612 are a searching part 6121, a connection availability determination part 6122, and a connection control part 6123. Among these parts, the searching part 6121 is identical to the searching part 2121 of the communication device 210 according to the second exemplary embodiment shown in FIG. 3.

The connection availability determination part 6123 has a function of, when registering the new other communication device information 6132 for a new node into the storage part 613, recording registration time into the time 61324 in the other communication device information 6132, in addition to the function which the connection availability determination part 2122 of the communication device 210 according to the second exemplary embodiment shown in FIG. 3 has. Further, the connection availability determination part 6123 has a function of determining even another communication device whose reliability degree 61322 has decreased to a threshold or less as connectable in a case where an elapsed time from the time 61324 of the other communication device information 6132 to the current time is more than the timeout time 6133.

Further, the connection control part 6123 has a function of, when updating the reliability degree 61322 and the connection state 61323, recording (overwriting) the update time into the time 61324, in addition to the function which the connection control part 2123 of the communication device 210 according to the second exemplary embodiment shown in FIG. 3 has.

Next, an operation of the communication device 610 according to this exemplary embodiment will be described. In the operation of the communication device 610 according to this exemplary embodiment, the operation except that of the connection availability determination part 6122 and the connection control part 6123 is identical to the operation of the communication device 210 according to the second exemplary embodiment. Below, the operation of the connection availability determination part 6122 and the connection control part 6123 will be described.

Figure 14:
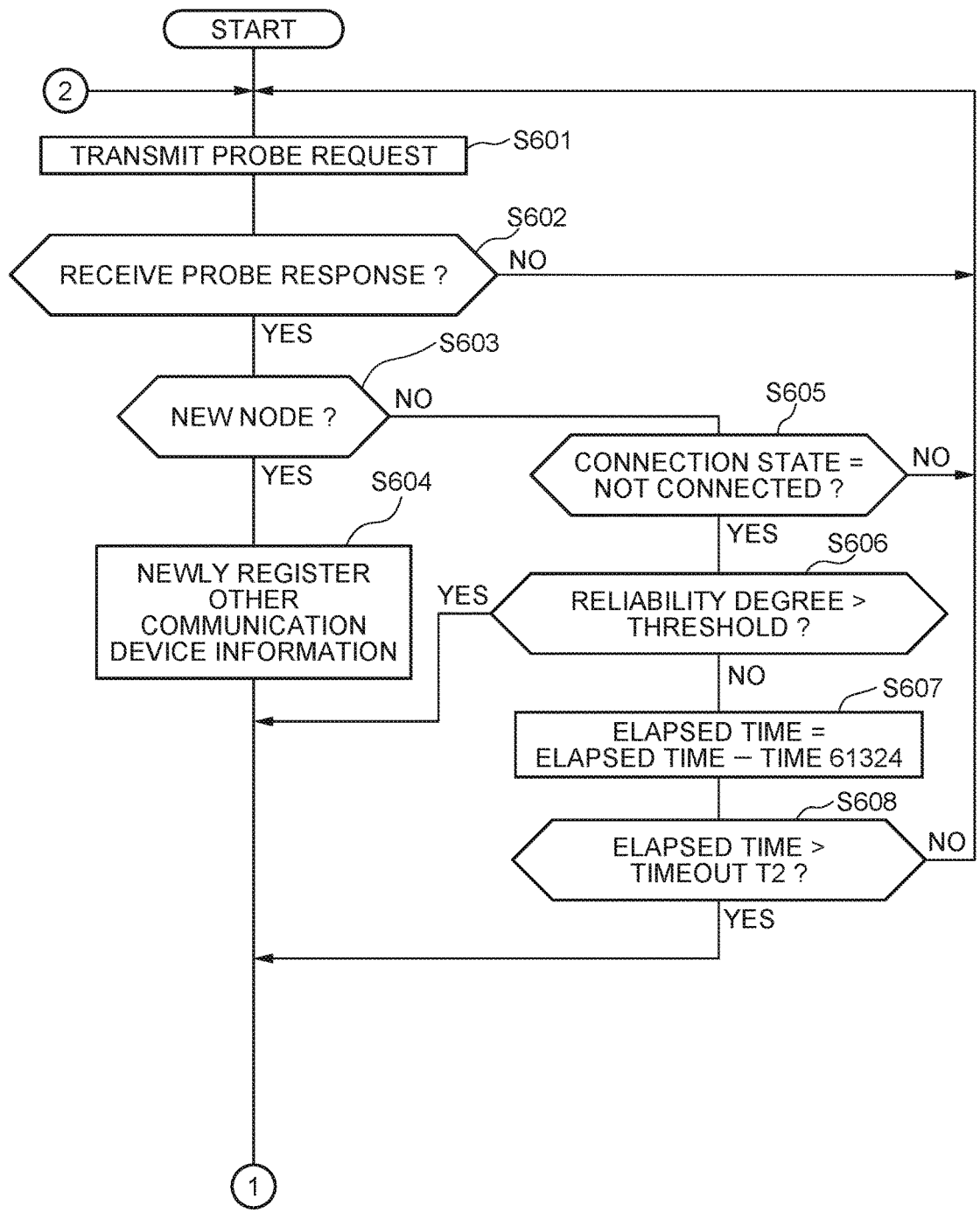
FIG. 14 is a flowchart showing an operation of the sixth exemplary embodiment of the present invention.

First, the operation of the connection availability determination part 6122 will be described. FIG. 14 is a flowchart showing the operation of the communication device 610 according to this exemplary embodiment. In FIG. 14, steps S601 to S606 are identical to steps S201 to S206 of FIG. 6. Referring to FIG. 14, in a case where the reliability degree 61322 in the other communication device information 6132 corresponding to the found other communication device is equal to or less than a threshold (NO at step S606), the connection availability determination part 6122 calculates an elapsed time from the time 61324 in the other communication device information to the current time (step S607). Next, the connection availability determination part 6132 determines whether or not the calculated elapsed time is more than the timeout time 6133 (step S608). In a case where the calculated elapsed time is not more than the timeout time 6133 (NO at step S608), the connection availability determination part 6132 determines unconnectable (NO at step S608), and causes the searching part 6121 to restart the search. On the other hand, in a case where the elapsed time is more than the timeout time 6133 (YES at step S608), the connection availability determination part 6132 notifies connectable to the connection control part 6123. Consequently, a process of connecting the other communication device and the local communication device by the connection control part 6123 is restarted.

Next, the operation of the connection control part 6123 will be described borrowing the flowchart of FIG. 6 showing the operation of the communication device 210 according to the second exemplary embodiment. When the connection process succeeds (YES at step S212), the connection control part 6123 updates the connection state 61323 in the other communication device information 6132 corresponding to the other communication device having succeeded in the connection process to "being connected," and sets the reliability degree 61322 to an initial value (step S213). In this process, the connection control part 6123 records (overwrites) the current time at that moment to the time in the other communication device information 6132. On the other hand, when the connection process fails (NO at step S212), the connection control part 6123 updates the connection state 61323 in the other communication device information 6132 corresponding to the other communication device having failed in the connection process to "not connected," and subtracts a given value from the value of the reliability degree 61322 (step S214). In this process, the connection control part 6123 records (overwrites) the current time at that moment to the time in the other communication device information 6132. The operation other than that operation is the same as the operation of the connection control part 2122 of the communication device 210 according to the second exemplary embodiment.

Thus, according to this exemplary embodiment, the same effect as in the second exemplary embodiment can be obtained, and also the following effect can be obtained.

According to this exemplary embodiment, it is possible to give an opportunity to execute a reconnection process on another communication device whose reliability degree 61322 has decreased to a threshold or less. This is because the connection availability determination part 6123 determines even another communication device whose reliability degree 61322 has decreased to the threshold or less as connectable in a case where an elapsed time from the time 61324 of the other communication device information 6132 to the current time is more than the timeout time 6133. Therefore, in a case where another communication device which cannot connect to the communication device 610 is brought to a connectable state because maintenance is thereafter done and a trouble is solved, it is possible to give an opportunity for reconnection to the other communication device.

This exemplary embodiment is based on the configuration and operation described above, and can be changed and modified in the following manner.

In the above description, the timeout time 6133 used in the determination at step S608 by the connection availability determination part 6122 is a fixed value, but the timeout time 6133 may be a variable value. For example, the connection availability determination part 6122 may use a longer timeout time as the difference between the reliability degree and the threshold used in the determination at step S606 is larger. For example, a timeout time to be used in the determination at step S608 may be calculated by previously storing the timeout time 6133 per unit quantity for the amount of difference per unit quantity between the reliability degree and the threshold into the timeout time 6133, and multiplying the timeout time 6133 per unit quantity by the actual amount of difference between the reliability degree and the threshold. Alternatively, a timeout time for each value of a difference between the reliability degree and the threshold may be previously stored.

Further, in the case of determining as connectable under a condition that the elapsed time exceeds the timeout time, the connection availability determination part 6122 may update the time 61324 in the other communication device information 6132 to the current time or any time between the time 61324 and the current time.

Seventh Exemplary Embodiment

Figure 15:
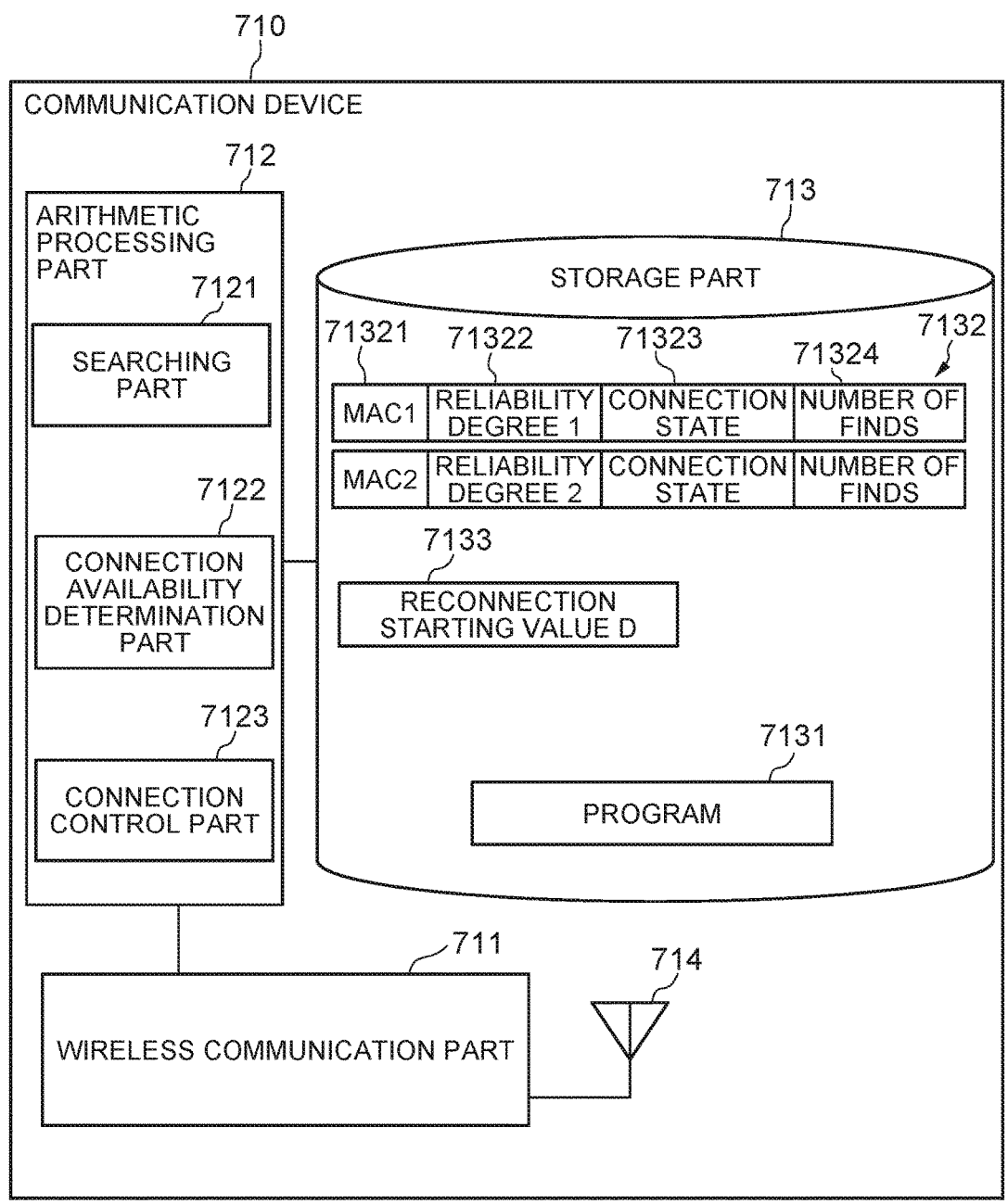
FIG. 15 is a block diagram of a seventh exemplary embodiment of the present invention.

Referring to FIG. 15, a communication device 710 according to a seventh exemplary embodiment of the present invention is a wireless communication terminal which forms a communication network conforming to the Wi-Fi Direct specification. The communication device 710 includes a wireless communication part 711, an arithmetic processing part 712, a storage part 713, and an antenna 714. Among these parts, the wireless communication part 711 and the antenna 714 are identical to the wireless communication part 110 and the antenna 114 of the communication device 110 according to the first exemplary embodiment shown in FIG. 1.

The storage part 713 is configured by a storage device such as a ROM, a RAM and a hard disk, and stores a program 7131 and processing information. The program 7131 is a program loaded and executed by the arithmetic processing part 712 to realize various processing parts. Major processing information stored in the storage part 713 is other communication device information 7132 and a reconnection starting value 7133.

The other communication device information 7132 has a MAC address 71321, a reliability degree 71322, a connection state 71323, and a number of finds 71324. The MAC address 71321, the reliability degree 71322 and the connection state 71323 are the same as the MAC address 21321, the reliability degree 21322 and the connection state 21323 of the other communication device information 2132 of the communication device 210 according to the second exemplary embodiment of the present invention shown in FIG. 2. The number of finds 71324 represents the total number of times that another communication device having the MAC address 71321 of the other communication device information 7132 has been found by the communication device 710 before.

The reconnection starting value (D) 7133 is information on the number of times for exceptionally relieving another communication device whose reliability degree 71322 has decreased to a value that cannot allow connection. Even another communication device whose reliability degree 71322 has decreased to a threshold or less is determined as connectable in a case where the number of finds 71324 exceeds the reconnection starting value 7133.

The arithmetic processing part 712 has a microprocessor such as an MPU and peripheral circuits thereof, and has a function of loading the program 7131 from the storage part 713 and executing the program 7131 to cause the above-mentioned hardware cooperate with the program 7131 and realize various processing parts. Major processing parts realized by the arithmetic processing part 712 are a searching part 7121, a connection availability determination part 7122, and a connection control part 7123. Among these parts, the searching part 7121 and the connection control part 7123 are the same as the searching part 2121 and the connection control part 2123 of the communication device 210 according to the second exemplary embodiment shown in FIG. 3.

The connection availability determination part 7123 has a function of, when registering the new other communication device information 7132 for a new node into the storage part 713, recording an initial value 1 into the number of finds 71324 in the abovementioned other communication device information 7132, in addition to the function which the connection availability determination part 2122 of the communication device 210 according to the second exemplary embodiment shown in FIG. 3 has. Moreover, the connection availability determination part 7123 has a function of, when finding a new other communication device other than the new node, adding 1 to the number of finds 71324 in the other communication device information 7132 corresponding to the abovementioned other communication device. Furthermore, the connection availability determination part 7123 has a function of determining another communication device whose reliability degree 71322 has decreased to a threshold or less as connectable in a case where the number of finds 71324 of the other communication device information 7132 thereof exceeds the reconnection starting value 7133.

Next, an operation of the communication device 710 according to this exemplary embodiment will be described. In the operation of the communication device 710 according to this exemplary embodiment, the operation except that of the connection availability determination part 7122 is the same as the operation of the communication device 210 according to the second exemplary embodiment. Below, the operation of the connection availability determination part 7122 will be described.

Figure 16:
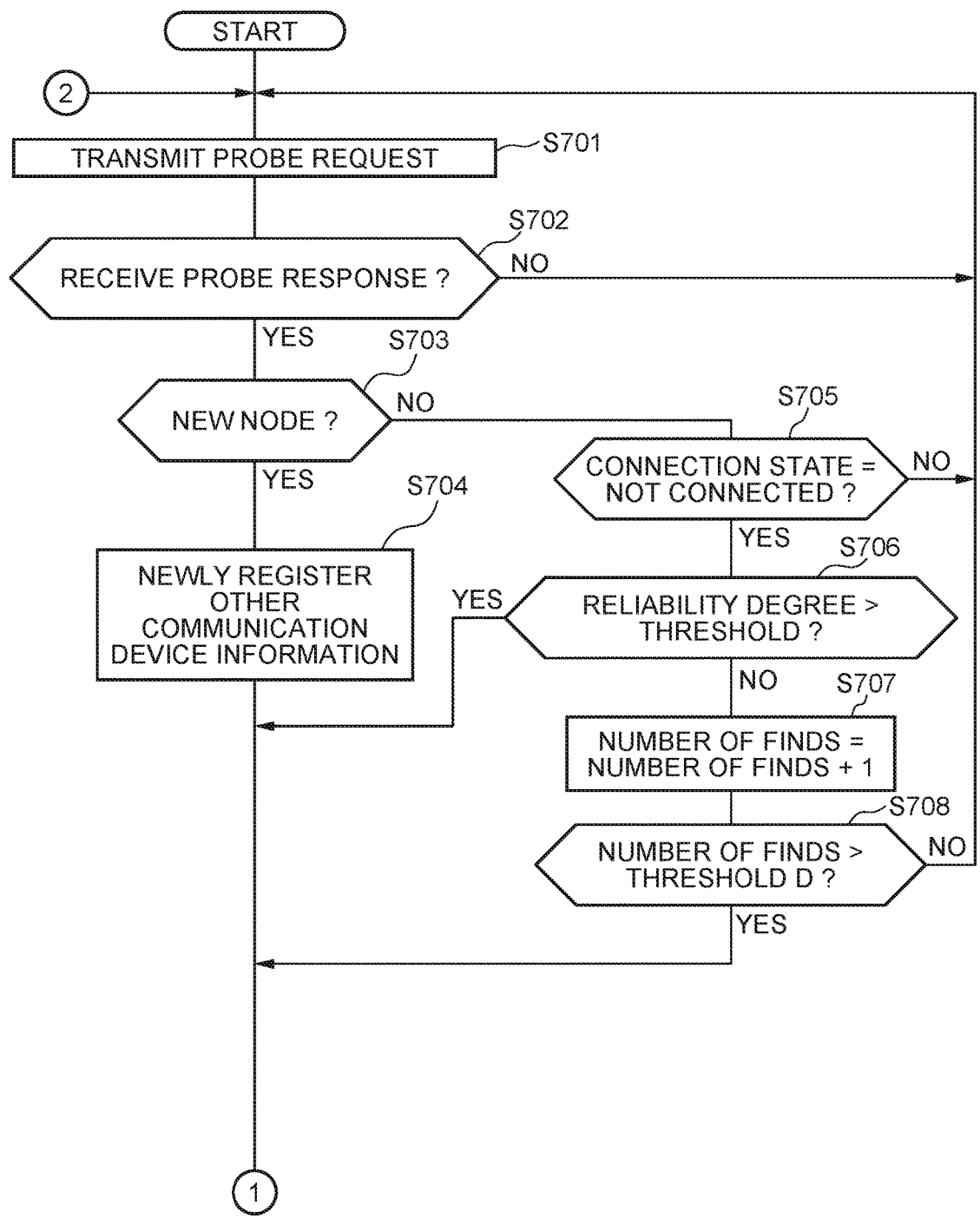
FIG. 16 is a flowchart showing an operation of the seventh exemplary embodiment of the present invention.

FIG. 16 is a flowchart showing the operation of the communication device 710 according to this exemplary embodiment. In FIG. 16, steps S701 to S703 and S705 to S706 are the same as steps S201 to S203 and S205 to S206 in FIG. 6. Referring to FIG. 16, in a case where the found other communication device is a new node (YES at step S703), the connection availability determination part 7122 registers the other communication device information 7132 for the new node into the storage part 713 (step S704). In this process, the connection availability determination part 7122 sets the number of finds 71324 to the initial value 1.

Further, in a case where the found other communication device is not a new node and is not connected (YES at step S705), the connection availability determination part 7122 determines whether or not the reliability degree 71322 in the other communication device information 7132 corresponding to the found other communication device is more than a threshold (step S706). In a case where the reliability degree 71322 is not more than the threshold (NO at step S706), the connection availability determination part 7122 increases by 1 the number of finds 71324 in the other communication device information 7132 (step S707), and determines whether or not the increased number of finds 71324 is more than the reconnection starting value 7133 (step S708). In a case where the increased number of finds 71324 is not more than the reconnection starting value 7133 (NO at step S708), the connection availability determination part 7132 determines as unconnectable, and causes the searching part 7121 to restart the search. On the other hand, in a case where the increased number of finds 71324 is more than the reconnection starting value 7133 (YES at step S708), the connection availability determination part 7122 notifies connectable to the connection control part 7123. Consequently, a process of connecting the abovementioned other communication device and the local communication device by the connection control part 7123 is started.

Thus, according to this exemplary embodiment, the same effect as in the second exemplary embodiment can be obtained, and also the following effect can be obtained.

According to this exemplary embodiment, it is possible to give an opportunity for reconnection to another communication device whose reliability degree 71322 has decreased to a threshold or less. This is because the connection availability determination part 7122 determines another communication device whose reliability degree 71322 has decreased to a threshold or less as connectable in a case where the number of finds 71324 of the other communication device information 7132 is more than the reconnection starting value 7133.

This exemplary embodiment is based on the configuration and operation described above, and may be modified and changed in the following manner.

In the above description, the reconnection starting value 7133 used in the determination at step S708 by the connection availability determination part 7122 is a fixed value, but the reconnection starting value 7133 may be a variable value. For example, the connection availability determination part 7122 may use a larger reconnection starting value as the difference between the reliability degree and the threshold used in the determination at step S606 is larger. For example, a reconnection starting value to be used in the determination at step S708 may be calculated by previously storing the reconnection starting value 7133 per unit quantity for a difference per unit quantity between the reliability degree and the threshold and multiplying the reconnection starting value 7133 per unit quantity by the actual amount of difference between the actual reliability degree and the threshold. Alternatively, a reconnection starting value for each value of the difference between the reliability degree and the threshold may be previously stored.

Further, in the case of determining as connectable under a condition that the number of finds is more than the reconnection starting value, the connection availability determination part 7122 may update the number of finds 71324 in the other communication device information 7132 to the initial value or any value between the initial value and the reconnection starting value.

Eighth Exemplary Embodiment

Figure 17:
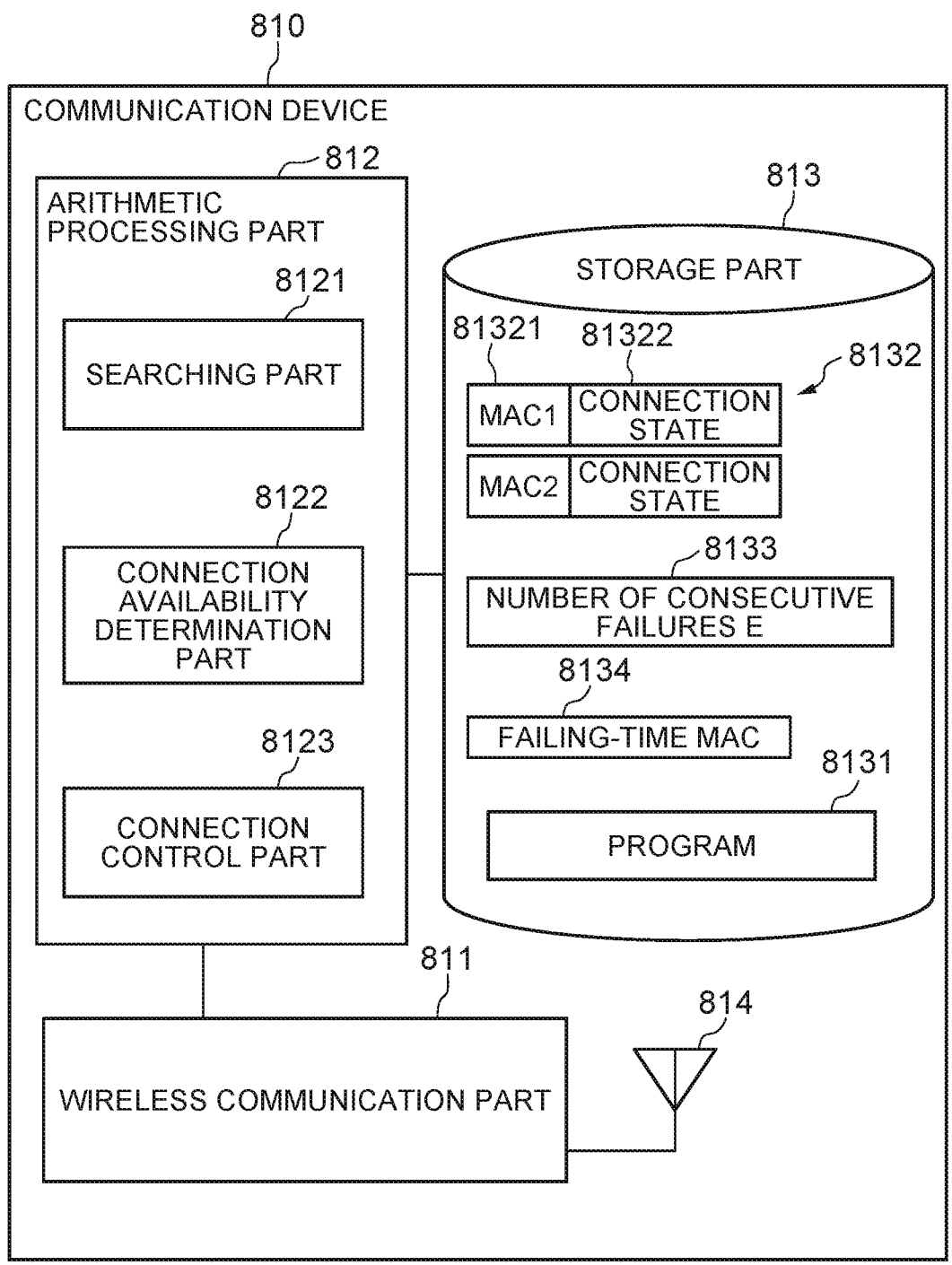
FIG. 17 is a block diagram of an eighth exemplary embodiment of the present invention.

Referring to FIG. 17, a communication device 810 according to an eighth exemplary embodiment of the present invention is a wireless communication terminal which forms a communication network conforming to the Wi-Fi Direct specification. The communication device 810 includes a wireless communication part 811, an arithmetic processing part 812, a storage part 813, and an antenna 814. Among these parts, the wireless communication part 811 and the antenna 814 are the same as the wireless communication part 111 and the antenna 114 of the communication device 110 according to the first exemplary embodiment shown in FIG. 1.

The storage part 813 is configured by a storage device such as a ROM, a RAM and a hard disk, and stores a program 8131 and processing information. The program 8131 is a program loaded and executed by the arithmetic processing part 812 to realize various processing parts. Major processing information stored by the storage part 813 is other communication device information 8132, a number of consecutive failures (E) 8133, and a failing-time MAC address 8134.

The other communication device information 8132 has a MAC address 81321 and a connection state 81322. The MAC address 81321 and the connection state 81322 are the same as the MAC address 21321 and the connection state 21323 of the other communication device information 2132 of the communication device 210 according to the second exemplary embodiment of the present invention shown in FIG. 2.

The failing-time MAC address 8134 represents a MAC address of another communication device which the communication device 810 has failed in the most recent connection process. The number of consecutive failures 8133 represents the number of times that another communication device identified by the failing-time MAC address 8134 has failed in the process of connecting to the communication device 810.

The arithmetic processing part 812 has a microprocessor such as an MPU and peripheral circuits thereof, and has a function of loading the program 8131 from the storage part 813 and executing the program 8131 to cause the abovementioned hardware to cooperate with the program 8131 and realize various processing parts. Major processing parts realized by the arithmetic processing part 812 are a searching part 8121, a connection availability determination part 8122, and a connection control part 8123. Among these parts, the searching part 8121 is the same as the searching part 2121 of the communication device 210 according to the second exemplary embodiment shown in FIG. 2.

The connection availability determination part 8122 has a function of determining whether or not to connect to another communication device found in search by the searching part 8121. To be specific, in a case where the found other communication device is a new node, the connection availability determination part 8122 determines as connectable. In a case where the found other communication device is not a new node and is a not-connected node, the connection availability determination part 8122 determines whether or not connection is available by using the failing-time MAC address 8134 and the number of consecutive failures 8133. That is to say, in a case where the MAC address of the found other communication device is not identical to the failing-time MAC address 8134, the connection availability determination part 8122 determines as connectable. In a case where the abovementioned MAC addresses are identical to each other, the connection availability determination part 8122 determines whether or not the number of consecutive failures 8133 is less than a threshold. The connection availability determination part 8122 determines as connectable in a case where the number of consecutive failures 8133 is less than the threshold, whereas determines as unconnectable in the other case. The result of determination whether or not to be connectable is notified from the connection availability determination part 8122 to the connection control part 8123.

When the connection availability determination part 8122 determines unconnectable, the connection control part 8123 causes the searching part 8121 to execute the search again. On the other hand, the connection control part 8123 has a function of, when the connection availability determination part 8122 determines connectable, executing a connection process conforming to the Wi-Fi Direct specification with the abovementioned other communication device. Moreover, the connection control part 8123 determines whether the connection process has succeeded or failed. In a case where the connection process succeeds, the connection control part 8123 records "being connected" into the connection state 81322 in the other communication device information 8132 having the same MAC address 81321 as the MAC address of the abovementioned other communication device, and sets the number of consecutive failures 8133 to an initial value 0. On the other hand, in a case where the connection process has failed, the connection control part 8123 records (overwrites) the MAC address of the other communication device having failed in connection to the failing-time MAC address 8134, and adds 1 to the number of consecutive failures 8133.

Figure 18:
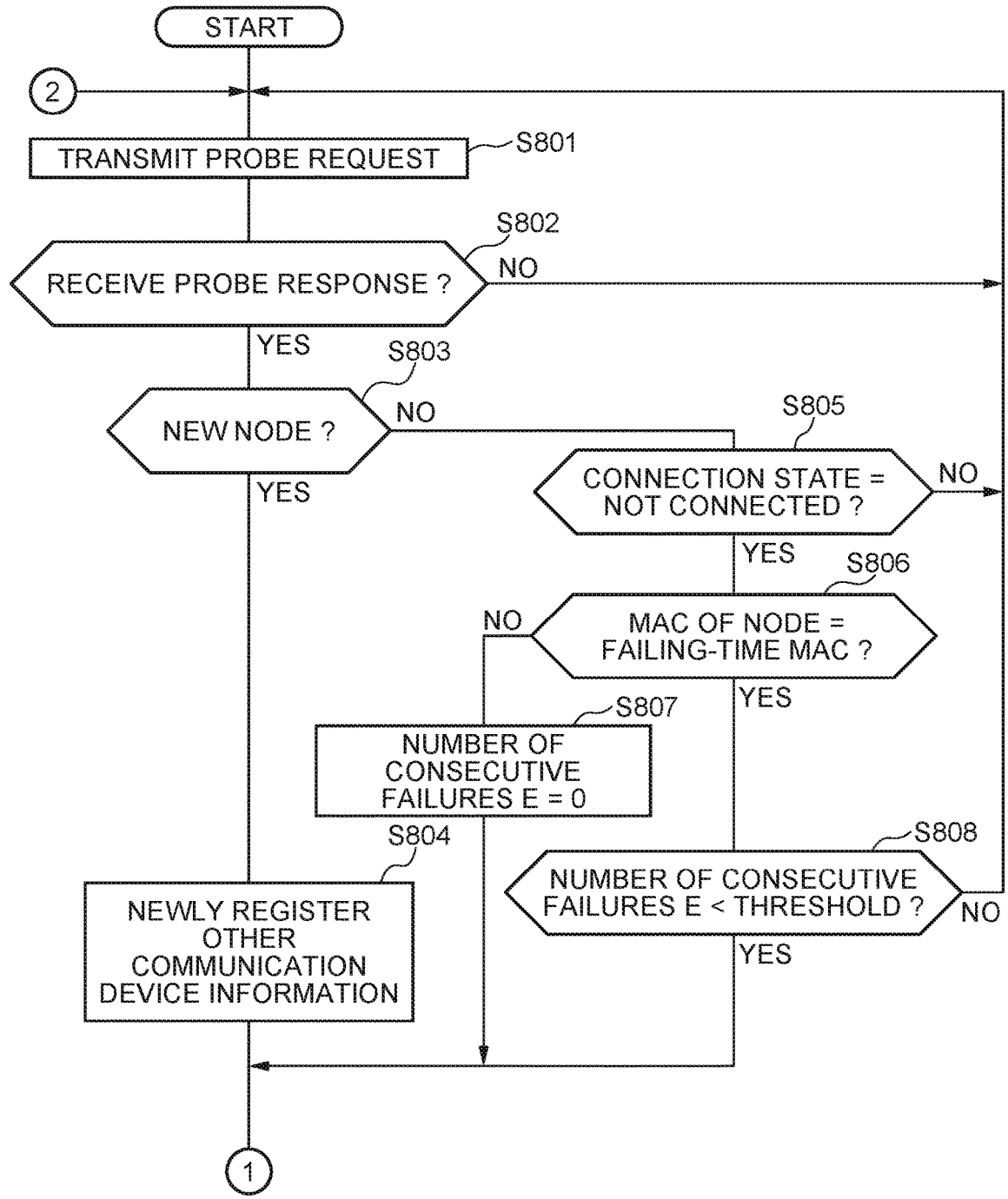
FIG. 18 is a flowchart showing an operation of the eighth exemplary embodiment of the present invention.
Figure 19:
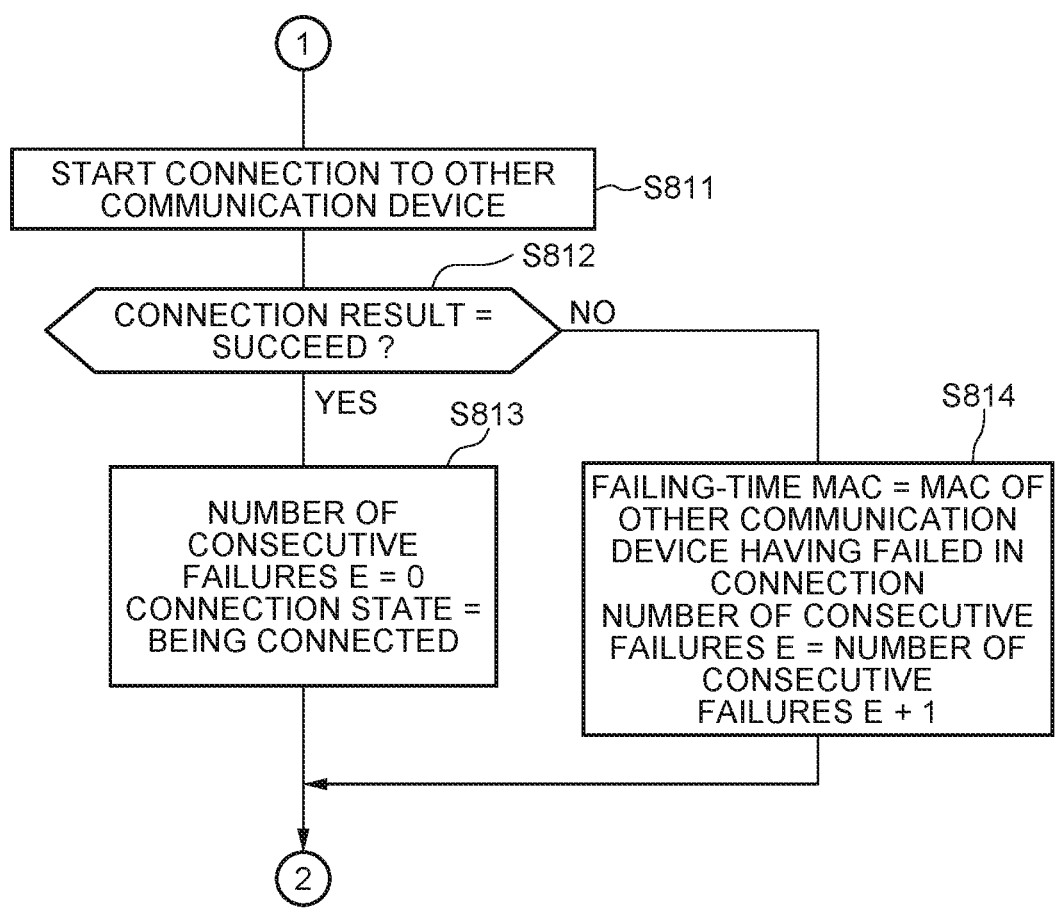
FIG. 19 is a flowchart showing an operation of the eighth exemplary embodiment of the present invention.

FIGS. 18 and 19 are flowcharts showing the operation of the communication device 810 according to this exemplary embodiment. Below, the operation of the communication device 810 according to this exemplary embodiment will be described referring to FIGS. 18 and 19.

When started, the communication device 810 begins execution of processing shown in FIG. 18. First, the searching part 8121 of the communication device 810 transmits and receives communication messages relating to search to and from another communication device existing around the local communication device 810 through the wireless communication part 811, thereby searching for a communication device around the communication device 810 (steps S801 and S802). The search for a communication device around the local communication device is performed by the method conforming to Device Discovery Procedure of the Wi-Fi Direct specification and described referring to FIG. 4. When finding a communication device (YES at step S802), the searching part 8121 notifies the MAC address and the like of the found communication device to the connection availability determination part 8122, and ends the search. On the other hand, in the case of being unable to find a communication device, the searching part 8121 continues a process of searching for a communication device around the local communication device.

When receiving the MAC address and the like of the found communication device from the searching part 8121, the connection availability determination part 8122 determines whether or not the found communication device is a new node, that is, whether or not the found communication device is another communication device whose other communication device information 8132 is not stored in the storage part 813 (step S803). In a case where the found communication device is a new node, the connection availability determination part 8122 newly creates the other communication device information 8132 for the found communication device and stores it into the storage part 813 (step S804). The MAC address of the found communication device is recorded into the MAC address 81321 of the newly recorded other communication device information 8132, and "not-connected" is recorded into the connection state 81322. Then, the connection availability determination part 8122 notifies connectable together with information such as the MAC address to the connection control part 8123.

On the other hand, in a case where the found communication device is not a new node (NO at step S803), the connection availability determination part 8122 determines whether or not the found communication device is a communication device which has not connected to the local communication device 810, on the basis of the connection state 81323 in the other communication device information 8132 corresponding to the found communication device (step S805). In a case where the found communication device is not a not-connected communication device (NO at step S805), the connection availability determination part 8122 instructs the searching part 8121 to perform the search via the connection control part 8123. Consequently, the searching part 8121 starts the search for another communication device around the local communication device again (step S801). On the contrary, in a case where the found communication device is a not-connected communication device (YES at step S805), the connection availability determination part 8122 determines whether or not the MAC address of the abovementioned other communication device coincides with the failing-time MAC address 8134 (step S806). In a case where the abovementioned MAC addresses do not coincide with each other (NO at step S806), the connection availability determination part 8122 notifies connectable together with information such as the MAC address to the connection control part 8123. On the contrary, in a case where the abovementioned MAC addresses coincide with each other (YES at step S806), the connection availability determination part 8122 determines whether or not the number of consecutive failures 8133 is less than a threshold (step S808). Next, in a case where the number of consecutive failures 8133 is equal to or more than the threshold (NO at step S808), the connection availability determination part 8122 instructs the searching part 8121 to perform the search via the connection control part 8123. Consequently, the searching part 8121 starts the search for another communication device around the local communication device again (step S801). On the other hand, in a case where the number of consecutive failures 8133 is less than the threshold (YES at step S808), the connection availability determination part 8122 notifies connectable to the connection control part 8123 together with information such as the MAC address.

When receiving notification of connectable from the connection availability determination part 8122, the connection control part 8123 executes a process of connecting the other communication device identified by the notified MAC address and the local communication device 810 (step S811 of FIG. 19). Then, the connection control part 8123 determines whether the connection process has succeeded or failed (step S812).

In a case where the connection process has failed, the connection control part 8123 records (overwrites) the MAC address of the other communication device having failed in connection into the failing-time MAC address 8134, and adds 1 to the number of consecutive failures 8133 (step S814). Then, the connection control part 8123 instructs the searching part 8121 to perform the search. Consequently, the searching part 8121 starts the search for another communication device around the local communication device again (step S801). On the contrary, in a case where the connection process has succeeded, the connection control part 8123 records "being connected" into the connection state 81322 in the other communication device information 8132 having the same MAC address 81321 as the MAC address of the other communication device having succeeded, and sets the number of consecutive failures 8133 to the initial value 0. Then, the connection control part 8123 instructs the searching part 8121 to perform the search. Consequently, the searching part 8121 starts the search for another connection device around the local communication device again (step S801).

Thus, according to this exemplary embodiment, it is possible to prevent the communication device 810 intending to connect to another communication device and form a communication network from repeating a process of reconnecting to another communication device to which the communication device 810 cannot connect, and it is possible to speedily connect to another communication terminal to which the communication device 810 can connect without trouble. This is because the communication device 810 holds identification information of another communication device having failed in the most recent connection process into the failing-time MAC 8134 and also records the number of failures into the number of consecutive failures 8133, and determines on the basis of whether or not another communication device found in the search is the other communication device having failed in the most recent connection process.

Further, according to this exemplary embodiment, depending on how to set the threshold, it is possible to regulate the number of times to repeat the reconnection process without aborting. For example, in the case of setting the threshold to "2," it is possible to set the number of times to repeat the reconnection process without aborting to two times. In the case of setting the threshold to "3," it is possible to set the number of times to repeat the reconnection process without aborting to three times.

Although the present invention is described above referring to the exemplary embodiments, the present invention is not limited to the exemplary embodiments. The configurations and details of the present invention can be changed and modified in various manners that can be understood by one skilled in the art within the scope of the present invention.

The present invention is based upon and claims the benefit of priority from Japanese patent application No. 2013-225137, filed on Oct. 30, 2013, the disclosure of which is incorporated herein in its entirety by reference.

INDUSTRIAL APPLICABILITY

The present invention can be applied to a communication device which forms a communication network conforming to the Wi-Fi direct specification, and the like.

The whole or part of the exemplary embodiments disclosed above can be described as, but not limited to, the following supplementary notes.

(Supplementary Note 1)

A communication device forming a communication network with another communication device, the communication device comprising:

a storage part storing a history of a failure in connection to the other communication device;

a searching part performing search for the other communication device existing around the local communication device;

a connection availability determination part performing determination whether or not to connect to the other communication device on a basis of the history of the failure in connection to the other communication device found in the search; and a connection control part causing the searching part to perform the search again when it is determined not to connect to the other communication device, while executing a connection process of connecting to the other communication device when it is determined to connect to the other communication device and, when the connection process fails, performing update of the history of the failure in connection to the other communication device and causing the searching part to perform the search again.

(Supplementary Note 2)

The communication device according to Supplementary Note 1, wherein:

the history includes identification information of the other communication device and a numerical value;

in the determination, the connection availability determination part compares, with a threshold, the numerical value included by the history including the identification information coinciding with identification information of the other communication device found in the search and, only in a case where a magnitude relation between the numerical value and the threshold satisfies a predetermined condition, the connection availability determination part determines to connect to the other communication device; and in the update of the history, the connection control part adds or subtracts a given value to or from the numerical value included by the history including the identification information coinciding with identification information of the other communication device failing in the connection process.

(Supplementary Note 3)

The communication device according to Supplementary Note 1, wherein:

the history includes identification information of the other communication device, a numerical value, and time information representing time of last update of said history;

in the update of the history, the connection control part adds or subtracts a given value to or from the numerical value included by the history including the identification information coinciding with identification information of the other communication device failing in the connection process, and also updates the time information; and in the determination, the connection availability determination part compares, with a threshold, the numerical value included by the history including the identification information coinciding with identification information of the other communication device found in the search, and also determines whether or not the time information included by the history represents time a given time or more earlier than current time and, only in a case where a magnitude relation between the numerical value and the threshold satisfies a predetermined condition or in a case where the time information included by the history represents time the given time or more earlier than current time though the predetermined condition is not satisfied, the connection availability determination part determines to connect to the other communication device.

(Supplementary Note 4)

The communication device according to Supplementary Note 3, wherein:

in the determining whether or not the time information included by the history represents time a given time or more earlier than current time, the connection availability determination part determines the given time on a basis of a difference between the numerical value included by the history and the threshold and, by using the determined given time, determines whether or not the time information included by the history represents time the given time or more earlier than current time.

(Supplementary Note 5)

The communication device according to Supplementary Note 1, wherein:

the history includes identification information of the other communication device, a numerical value, and a number of times that said other communication device is found in the search;

in the update of the history, the connection control part adds or subtracts a given value to or from the numerical value included by the history including the identification information coinciding with identification information of the other communication device failing in the connection process, and also updates the number of times; and in the determination, the connection availability determination part compares, with a threshold, the numerical value included by the history including the identification information coinciding with identification information of the other communication device found in the search, and also determines whether or not the number of times included by the history is a given number of times or more and, only in a case where a magnitude relation between the numerical value and the threshold satisfies a predetermined condition or in a case where the number of times included by the history is the given number of times or more though the predetermined condition is not satisfied, the connection availability determination part determines to connect to the other communication device.

(Supplementary Note 6)

The communication device according to Supplementary Note 5, wherein:

in the determining whether or not the number of times included by the history is a given number of times or more, the connection availability determination part determines the given number of times on a basis of a difference between the numerical value included by the history and the threshold and, by using the determined given number of times, determines whether or not the number of times included by the history is the given number of times or more.

(Supplementary Note 7)

The communication device according to any of Supplementary Notes 2 to 6, wherein:

the storage part stores a value corresponding to a cause of a failure of the connection process; and in the update of the history, the connection control part adds or subtracts the value corresponding to the cause of the failure of the connection process to or from the numerical value included by the history including the identification information coinciding with identification information of the other communication device failing in said connection process.

(Supplementary Note 8)

The communication device according to any of Supplementary Notes 2 to 6, wherein:

when the connection process of connecting to the other communication device succeeds, the connection control part initializes the numerical value included by the history including the identification information coinciding with identification information of the other communication device succeeding in the connection process.

(Supplementary Note 9)

The communication device according to any of Supplementary Notes 2 to 6, wherein:

the storage part stores the history for each of other communication devices.

(Supplementary Note 10)

The communication device according to Supplementary Note 9, wherein:

the connection availability determination part checks whether or not the history of the other communication device found in the search exists in the storage part and, in a case where the history does not exist, newly stores the history for the found other communication device into the storage part.

(Supplementary Note 11)

The communication device according to Supplementary Note 10, wherein:

in the newly storing the history into the storage part, the connection availability determination part determines whether or not a total number of histories stored in the storage part has reached a threshold and, in a case where the total number has reached the threshold, the connection availability determination part deletes oldest one of the histories stored in the storage part and thereafter newly stores the history for the found other communication terminal into the storage part.

(Supplementary Note 12)

The communication device according to Supplementary Note 11, wherein the history includes time when said history has been newly stored or time when said history has been last updated, the communication device comprising a deletion part deleting the history including the time a given time or more earlier than current time of the histories stored in the storage part.

(Supplementary Note 13)

The communication device according to Supplementary Note 1, wherein:

the history stored in the storage part includes identification information of the other communication device to which the local communication device has failed to connect in the most recent connection process, and a number of times that the other communication device identified by said identification information has successively failed in the connection process;

the connection control part sets the number of times in the history to an initial value when the connection process succeeds and, in the update of the history, the connection control part records identification information of the other communication device failing in the connection process into the history and increments the number of times; and in the determination whether or not to be connectable, the connection availability determination part sets the number of times to the initial value and determines to be connectable in a case where identification information of the other communication device found in the search and the identification information stored in the history do not coincide, whereas in a case where the identification information coincide, the connection availability determination part determines to be connectable when the number of times in the history is not more than a threshold, otherwise the connection availability determination part determines to be unconnectable.

(Supplementary Note 14)

The communication device according to any of Supplementary Notes 1 to 13, wherein:

the communication network is a communication network in which one of a plurality of communication terminals functions as a master having an access point function and another of the communication terminals functions as a slave to the master; and in the search for the other communication device existing around the local communication device, the searching part broadcasts a probe request in order to search for the other communication device existing around the local communication device, and receives a probe response from the other communication device receiving the probe request, thereby finding the other communication device existing around the local communication device.

(Supplementary Note 15)

A communication connection method executed by a communication device including a storage part storing a history of a failure in connection to another communication device, the communication device forming a communication network with the other communication device, the communication connection method comprising:

performing search for the other communication device existing around the local communication device;

performing determination whether or not to connect to the other communication device on a basis of the history of the failure in connection to the other communication device found in the search; and causing the searching part to perform the search again when it is determined not to connect to the other communication device, while executing a connection process of connecting to the other communication device when it is determined to connect to the other communication device and, when the connection process fails, performing update of the history of the failure in connection to the other communication device and causing the searching part to perform the search again.

(Supplementary Note 16)

A computer program comprising instructions for causing a computer which configures a communication device including a storage part storing a history of a failure in connection to another communication device and forming a communication network with the other communication device, to functions as:

a searching part performing search for the other communication device existing around the local communication device;

a connection availability determination part performing determination whether or not to connect to the other communication device on a basis of the history of the failure in connection to the other communication device found in the search; and a connection control part causing the searching part to perform the search again when it is determined not to connect to the other communication device, while executing a connection process of connecting to the other communication device when it is determined to connect to the other communication device and, when the connection process fails, performing update of the history of the failure in connection to the other communication device and causing the searching part to perform the search again.

(Supplementary Note 17)

A communication network system including a plurality of communication devices, the communication device comprising:

a storage part storing a history of a failure in connection to another communication device;

a searching part performing search for the other communication device existing around the local communication device;

a connection availability determination part performing determination whether or not to connect to the other communication device on a basis of the history of the failure in connection to the other communication device found in the search; and a connection control part causing the searching part to perform the search again when it is determined not to connect to the other communication device, while executing a connection process of connecting to the other communication device when it is determined to connect to the other communication device and, when the connection process fails, performing update of the history of the failure in connection to the other communication device and causing the searching part to perform the search again.

(Supplementary Note 18)

A communication connection method in a communication network system configured by a plurality of communication devices, the communication device including a storage part storing a history of a failure in connection to the other communication device, the communication connection method comprising, by one of the communication devices:

performing search for the other communication device existing around the local communication device;

performing determination whether or not to connect to the other communication device on a basis of the history of the failure in connection to the other communication device found in the search; and causing the searching part to perform the search again when it is determined not to connect to the other communication device, while executing a connection process of connecting to the other communication device when it is determined to connect to the other communication device and, when the connection process fails, performing update of the history of the failure in connection to the other communication device and causing the searching part to perform the search again.

DESCRIPTION OF NUMERALS 110 communication device
111 wireless communication part 112 arithmetic processing part
113 storage part
114 antenna
1121 searching part
1122 connection availability determination part
1123 connection control part
1132 history

What is claimed is:

1. A communication device forming a communication network with another communication device, the communication device comprising:
- a storage part configured to store a history of a failure in connection to the other communication device;
- a searching part configured to perform search for the other communication device existing therearound;
- a connection availability determination part configured to perform determination whether or not to connect to the other communication device on a basis of the history of the failure in connection to the other communication device found in the search; and
- a connection control part configured to: cause the searching part to perform the search again when it is determined not to connect to the other communication device; while execute a connection process of connecting to the other communication device when it is determined to connect to the other communication device; and; when the connection process fails, perform update of the history of the failure in connection to the other communication device and cause the searching part to perform the search again, wherein:

the history includes identification information of the other communication device and a numerical value;

the connection availability determination part is configured to in the determination: compare with a threshold the numerical value included by the history including the identification information coinciding with identification information of the other communication device found in the search; and only in a case where a magnitude relation between the numerical value and the threshold satisfies a predetermined condition, determine to connect to the other communication device; and the connection control part is configured to, in the update of the history, add or subtract a given value to or from the numerical value included by the history including the identification information coinciding with identification information of the other communication device failing in the connection process.

2. A communication device forming a communication network with another communication device, the communication device comprising:
- a storage part configured to store a history of a failure in connection to the other communication device;
- a searching part configured to perform search for the other communication device existing therearound;
- a connection availability determination part configured to perform determination whether or not to connect to the other communication device on a basis of the history of the failure in connection to the other communication device found in the search; and
- a connection control part configured to: cause the searching part to perform the search again when it is determined not to connect to the other communication device; while execute a connection process of connecting to the other communication device when it is determined to connect to the other communication device; and; when the connection process fails, perform update of the history of the failure in connection to the other communication device and cause the searching part to perform the search again, wherein:

the history includes identification information of the other communication device, a numerical value, and time information representing time of last update of said history;

the connection control part is configured to, in the update of the history, add or subtract a given value to or from the numerical value included by the history including the identification information coinciding with identification information of the other communication device failing in the connection process, and update the time information; and the connection availability determination part is configured to in the determination: compare with a threshold the numerical value included by the history including the identification information coinciding with identification information of the other communication device found in the search; determine whether or not the time information included by the history represents time a given time or more earlier than current time; and only in a case where a magnitude relation between the numerical value and the threshold satisfies a predetermined condition or in a case where the time information included by the history represents time the given time or more earlier than current time though the predetermined condition is not satisfied, determine to connect to the other communication device.

3. A communication device forming a communication network with another communication device, the communication device comprising:
- a storage part configured to store a history of a failure in connection to the other communication device;
- a searching part configured to perform search for the other communication device existing therearound;
- a connection availability determination part configured to perform determination whether or not to connect to the other communication device on a basis of the history of the failure in connection to the other communication device found in the search; and
- a connection control part configured to: cause the searching part to perform the search again when it is determined not to connect to the other communication device; while execute a connection process of connecting to the other communication device when it is determined to connect to the other communication device; and; when the connection process fails, perform update of the history of the failure in connection to the other communication device and cause the searching part to perform the search again, wherein:

the history includes identification information of the other communication device, a numerical value, and a number of times that said other communication device is found in the search;

the connection control part is configured to, in the update of the history, add or subtract a given value to or from the numerical value included by the history including the identification information coinciding with identification information of the other communication device failing in the connection process, and update the number of times; and the connection availability determination part is configured to in the determination: compare with a threshold the numerical value included by the history including the identification information coinciding with identification information of the other communication device found in the search; determine whether or not the number of times included by the history is a given number of times or more; and only in a case where a magnitude relation between the numerical value and the threshold satisfies a predetermined condition or in a case where the number of times included by the history is the given number of times or more though the predetermined condition is not satisfied, determine to connect to the other communication device.

4. The communication device according to claim 3, wherein:
the storage part is configured to store a value corresponding to a cause of a failure of the connection process; and
the connection control part is configured to, in the update of the history, add or subtract the value corresponding to the cause of the failure of the connection process to or from the numerical value included by the history including the identification information coinciding with identification information of the other communication device failing in said connection process.

5. A communication device forming a communication network with another communication device, the communication device comprising:
a storage part configured to store a history of a failure in connection to the other communication device;
a searching part configured to perform search for the other communication device existing therearound;
a connection availability determination part configured to perform determination whether or not to connect to the other communication device on a basis of the history of the failure in connection to the other communication device found in the search; and
a connection control part configured to: cause the searching part to perform the search again when it is determined not to connect to the other communication device; while execute a connection process of connecting to the other communication device when it is determined to connect to the other communication device; and when the connection process fails, perform update of the history of the failure in connection to the other communication device and cause the searching part to perform the search again, wherein:
the history stored in the storage part includes identification information of the other communication device to which the local communication device has failed to connect in the most recent connection process, and a number of times that the other communication device identified by said identification information has successively failed in the connection process;
the connection control part is configured to set the number of times in the history to an initial value when the connection process succeeds and, in the update of the history, record identification information of the other communication device failing in the connection process into the history and increments the number of times; and
the connection availability determination part is configured to in the determination whether or not to be connectable: set the number of times to the initial value and determine to be connectable in a case where identification information of the other communication device found in the search and the identification information stored in the history do not coincide; whereas in a case where the identification information coincide, determine to be connectable when the number of times in the history is not more than a threshold, otherwise determine to be unconnectable.

6. A communication connection method executed by a communication device including a storage part storing a history of a failure in connection to another communication device, the communication device forming a communication network with the other communication device, the communication connection method comprising:
performing search for the other communication device existing therearound;
performing determination whether or not to connect to the other communication device on a basis of the history of the failure in connection to the other communication device found in the search; and
performing the search again in a case where it is determined not to connect to the other communication device, while executing a connection process of connecting to the other communication device in a case where it is determined to connect to the other communication device and, when the connection process fails, performing update of the history of the failure in connection to the other communication device and performing the search again;
in the search, in order to search for the other communication device, broadcasting a probe request and receiving a probe response to the probe request, thereby finding the other communication device;
when a plurality of other communication devices return probe responses to the probe request, determining the other communication device as a connection destination on a basis of the history of the failure in connection to the other communication device returning the probe response and an order of reception of the probe responses.

7. A communication connection method executed by a communication device including a storage part storing a history of a failure in connection to another communication device, the communication device forming a communication network with the other communication device, the communication connection method comprising:
performing search for the other communication device existing therearound;
performing determination whether or not to connect to the other communication device on a basis of the history of the failure in connection to the other communication device found in the search; and
performing the search again in a case where it is determined not to connect to the other communication device, while executing a connection process of connecting to the other communication device in a case where it is determined to connect to the other communication device and, when the connection process fails, performing update of the history of the failure in connection to the other communication device and performing the search again,
wherein the history includes identification information of the other communication device and a numerical value;
in the determination whether or not to connect to the other communication device, comparing with a threshold the numerical value included by the history including the identification information coinciding with identification information of the other communication device found in the search and, only in a case where a magnitude relation between the numerical value and the threshold satisfies a predetermined condition, determining to connect to the other communication device; and
in the update of the history, adding or subtracting a given value to or from the numerical value included by the history including the identification information coinciding with identification information of the other communication device failing in the connection process.

8. The communication connection method according to claim 7, wherein the storage part is configured to store a value corresponding to a cause of a failure of the connection process, the communication connection method comprising:
in the update of the history, adding or subtracting the value corresponding to the cause of the failure of the connection process to or from the numerical value included by the history including the identification information coinciding with identification information of the other communication device failing in said connection process.

9. A communication connection method executed by a communication device including a storage part storing a history of a failure in connection to another communication device, the communication device forming a communication network with the other communication device, the communication connection method comprising:
performing search for the other communication device existing therearound;
performing determination whether or not to connect to the other communication device on a basis of the history of the failure in connection to the other communication device found in the search; and
performing the search again in a case where it is determined not to connect to the other communication device, while executing a connection process of connecting to the other communication device in a case where it is determined to connect to the other communication device and, when the connection process fails, performing update of the history of the failure in connection to the other communication device and performing the search again,
wherein the history includes identification information of the other communication device, a numerical value, and time information representing time of last update of said history;
in the update of the history, adding or subtracting a given value to or from the numerical value included by the history including the identification information coinciding with identification information of the other communication device failing in the connection process, and updating the time information; and
in the determination whether or not to connect to the other communication device: comparing with a threshold the numerical value included by the history including the identification information coinciding with identification information of the other communication device found in the search; determining whether or not the time information included by the history represents time a given time or more earlier than current time, and only in a case where a magnitude relation between the numerical value and the threshold satisfies a predetermined condition or in a case where the time information included by the history represents time the given time or more earlier than current time though the predetermined condition is not satisfied, determining to connect to the other communication device.

10. A communication connection method executed by a communication device including a storage part storing a history of a failure in connection to another communication device, the communication device forming a communication network with the other communication device, the communication connection method comprising:
performing search for the other communication device existing therearound;
performing determination whether or not to connect to the other communication device on a basis of the history of the failure in connection to the other communication device found in the search; and
performing the search again in a case where it is determined not to connect to the other communication device, while executing a connection process of connecting to the other communication device in a case where it is determined to connect to the other communication device and, when the connection process fails, performing update of the history of the failure in connection to the other communication device and performing the search again,
wherein the history includes identification information of the other communication device, a numerical value, and a number of times that said other communication device is found in the search;
in the update of the history, adding or subtracting a given value to or from the numerical value included by the history including the identification information coinciding with identification information of the other communication device failing in the connection process, and updating the number of times; and
in the determination whether or not to connect to the other communication device: comparing with a threshold the numerical value included by the history including the identification information coinciding with identification information of the other communication device found in the search; determining whether or not the number of times included by the history is a given number of times or more; and only in a case where a magnitude relation between the numerical value and the threshold satisfies a predetermined condition or in a case where the number of times included by the history is the given number of times or more though the predetermined condition is not satisfied, determining to connect to the other communication device.

11. A communication connection method executed by a communication device including a storage part storing a history of a failure in connection to another communication device, the communication device forming a communication network with the other communication device, the communication connection method comprising:
performing search for the other communication device existing therearound;
performing determination whether or not to connect to the other communication device on a basis of the history of the failure in connection to the other communication device found in the search; and
performing the search again in a case where it is determined not to connect to the other communication device, while executing a connection process of connecting to the other communication device in a case where it is determined to connect to the other communication device and, when the connection process fails, performing update of the history of the failure in connection to the other communication device and performing the search again,
wherein the history stored in the storage part includes identification information of the other communication device having failed in the most recent connection process, and a number of times that the other communication device identified by said identification information has successively failed in the connection process;

setting the number of times in the history to an initial value when the connection process of connecting to the other communication device succeeds;
in the update of the history, recording identification information of the other communication device failing in the connection process into the history and incrementing the number of times; and
in the determination whether or not to connect to the other communication device: setting the number of times to the initial value and determining to be connectable in a case where identification information of the other communication device found in the search and the identification information stored in the history do not coincide; whereas in a case where the identification information coincide, determining to be connectable when the number of times in the history is not more than a threshold, otherwise determining to be unconnectable.

* * * * *